US009347671B2

(12) United States Patent
Bringe et al.

(10) Patent No.: US 9,347,671 B2
(45) Date of Patent: May 24, 2016

(54) HOUSEHOLD APPLIANCE HAVING A WARMING DRAWER WITH A THERMALLY CONDUCTIVE LAYER

(75) Inventors: William Bringe, Powell, TN (US); Samuel Harward, Knoxville, TN (US); Benjamin Warf, Belvidere, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 269 days.

(21) Appl. No.: 13/483,097

(22) Filed: May 30, 2012

(65) Prior Publication Data

US 2013/0319995 A1 Dec. 5, 2013

(51) Int. Cl.
| | |
|---|---|
| A47J 36/26 | (2006.01) |
| F24C 15/18 | (2006.01) |
| H05B 3/30 | (2006.01) |
| H05B 3/22 | (2006.01) |
| F24C 7/00 | (2006.01) |
| F24C 15/10 | (2006.01) |
| H05B 3/26 | (2006.01) |
| A47J 39/00 | (2006.01) |

(52) U.S. Cl.
CPC ............... *F24C 7/00* (2013.01); *F24C 15/105* (2013.01); *H05B 3/265* (2013.01); *A47J 39/006* (2013.01); *F24C 15/18* (2013.01)

(58) Field of Classification Search
CPC .... H05B 1/0252; H05B 1/0294; H05B 3/265; H05B 3/68; H05B 3/74; H05B 3/746; H05B 3/748; H05B 2203/013; H05B 2203/016; H05B 2203/028; H05B 2203/033; F24C 7/06; F24C 7/083; F24C 15/102; F24C 15/104; F24C 15/105; F24C 15/18
See application file for complete search history.

(56) References Cited

U.S. PATENT DOCUMENTS

| | | | | | |
|---|---|---|---|---|---|
| 2,976,386 | A | * | 3/1961 | Salton | 219/450.1 |
| 3,317,709 | A | * | 5/1967 | Beasley | 219/448.17 |
| 3,521,029 | A | * | 7/1970 | Toyooka et al. | 219/201 |
| 3,883,719 | A | * | 5/1975 | Hurko | 219/466.1 |
| 3,987,275 | A | * | 10/1976 | Hurko | 219/451.1 |
| 4,068,115 | A | * | 1/1978 | Mack et al. | 219/386 |
| 5,140,134 | A | * | 8/1992 | Reusche et al. | 219/441 |
| 5,198,638 | A | * | 3/1993 | Massacesi | 219/209 |
| 5,276,310 | A | * | 1/1994 | Schmidt et al. | 219/521 |
| 5,345,063 | A | * | 9/1994 | Reusche et al. | 219/441 |
| 5,508,495 | A | * | 4/1996 | Yahav et al. | 219/466.1 |
| 6,037,572 | A | * | 3/2000 | Coates et al. | 219/451.1 |
| 6,166,353 | A | * | 12/2000 | Senneville et al. | 219/385 |
| 6,384,380 | B1 | * | 5/2002 | Faries et al. | 219/385 |
| 6,525,298 | B1 | * | 2/2003 | Hunts | 219/400 |
| 7,009,151 | B2 | * | 3/2006 | Lee | 219/460.1 |
| 7,170,035 | B2 | * | 1/2007 | Peterson et al. | 219/386 |
| 7,208,700 | B2 | * | 4/2007 | Peterson et al. | 219/386 |
| 7,235,762 | B2 | * | 6/2007 | Gagas et al. | 219/400 |
| 7,279,659 | B2 | * | 10/2007 | Gagas et al. | 219/400 |
| 7,326,885 | B2 | * | 2/2008 | Lockwood et al. | 219/443.1 |

(Continued)

*Primary Examiner* — Joseph M Pelham
(74) *Attorney, Agent, or Firm* — James E. Howard; Andre Pallapies

(57) ABSTRACT

A household appliance includes a warming drawer housing having an interior chamber and a warming drawer module in the interior chamber. The warming drawer module includes a glass heating element forming a floor surface of the warming drawer module for receiving items to be warmed, a thermostat having a sensor measuring a temperature of the glass heating element, the thermostat being disposed under the glass heating element, and a thermally conductive layer disposed between an underside of the glass heating element and the sensor of the thermostat.

31 Claims, 16 Drawing Sheets

(56) References Cited

U.S. PATENT DOCUMENTS

| | | | |
|---|---|---|---|
| 7,488,919 B2* | 2/2009 | Gagas et al. | 219/400 |
| 7,619,182 B2* | 11/2009 | Morrow et al. | 219/391 |
| 8,291,816 B2* | 10/2012 | Iwamoto et al. | 99/467 |
| 2003/0029858 A1* | 2/2003 | Gratz et al. | 219/448.17 |
| 2004/0149722 A1* | 8/2004 | Schnell et al. | 219/460.1 |
| 2005/0274712 A1* | 12/2005 | Gagas et al. | 219/494 |
| 2006/0043087 A1* | 3/2006 | Gagas et al. | 219/391 |
| 2006/0049172 A1* | 3/2006 | Gagas et al. | 219/521 |
| 2006/0278629 A1* | 12/2006 | Gagas et al. | 219/385 |
| 2010/0133263 A1* | 6/2010 | Toyoda et al. | 219/681 |

* cited by examiner

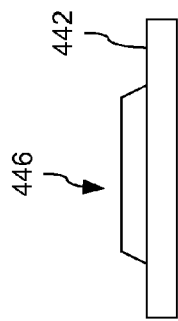
FIG. 10A
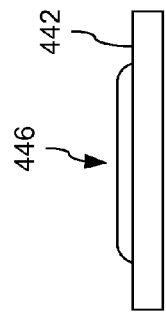
FIG. 10B
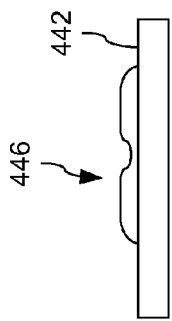
FIG. 10C
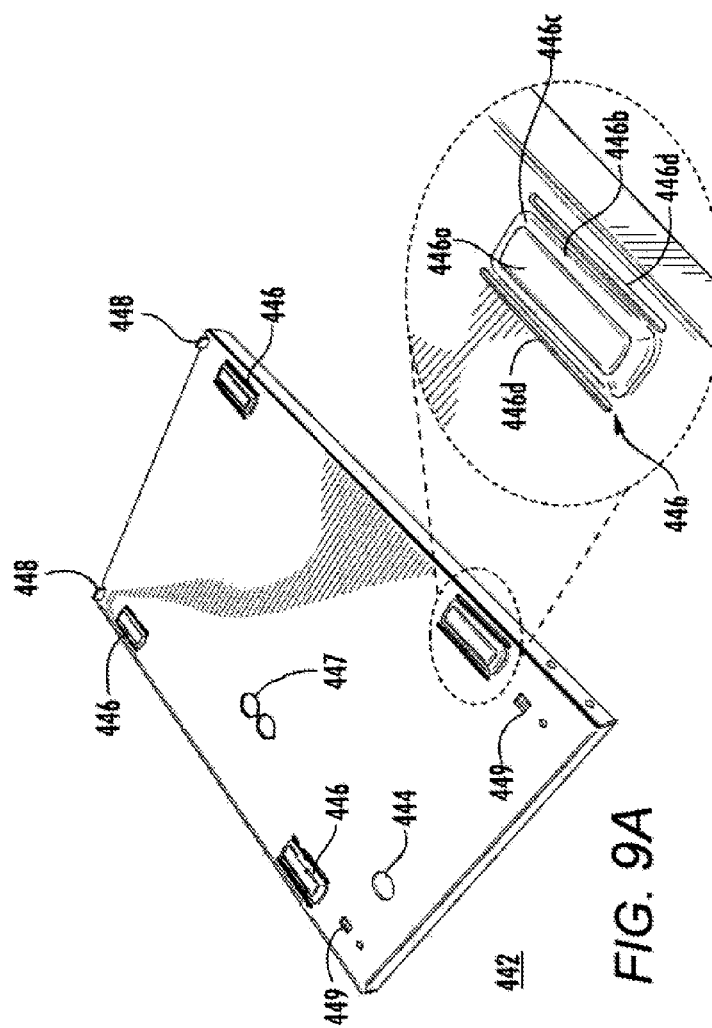
FIG. 9A
FIG. 9B

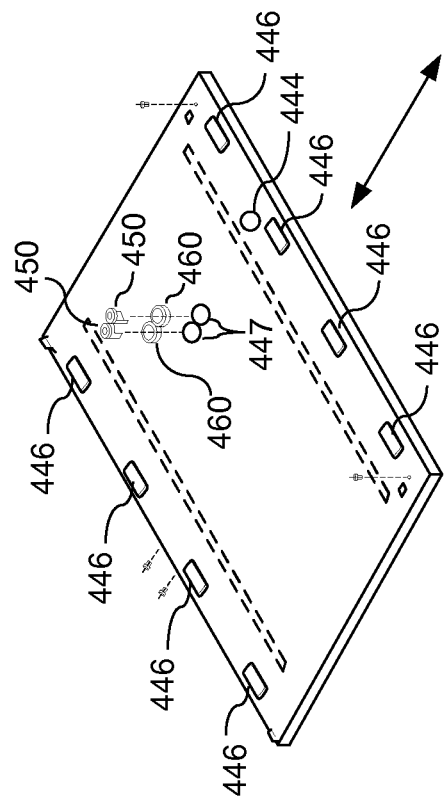
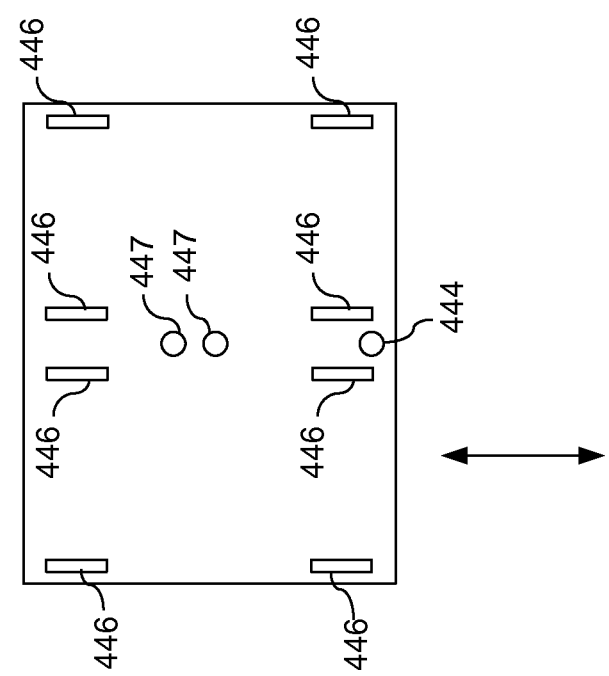
FIG. 12B
FIG. 12A

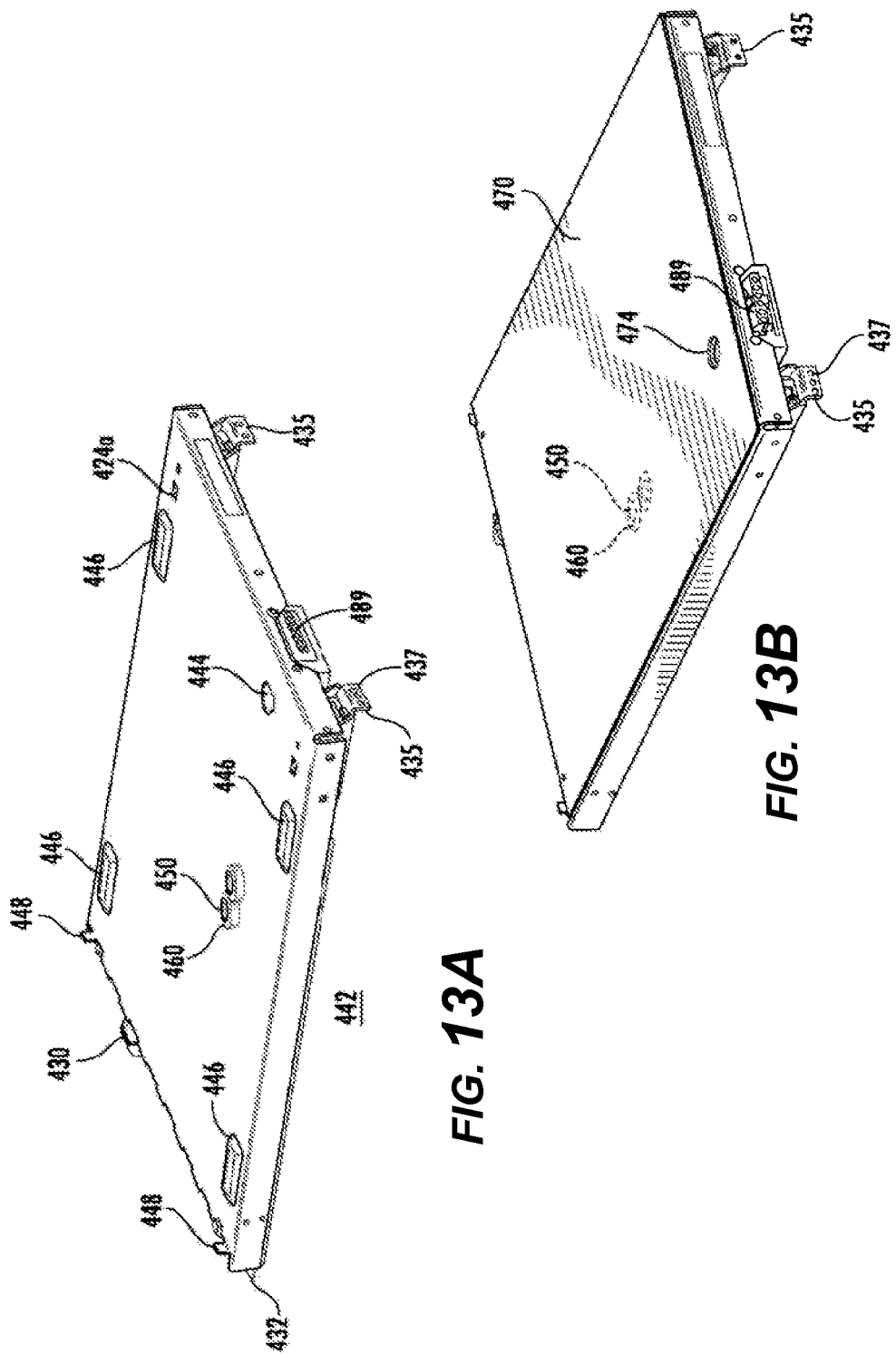

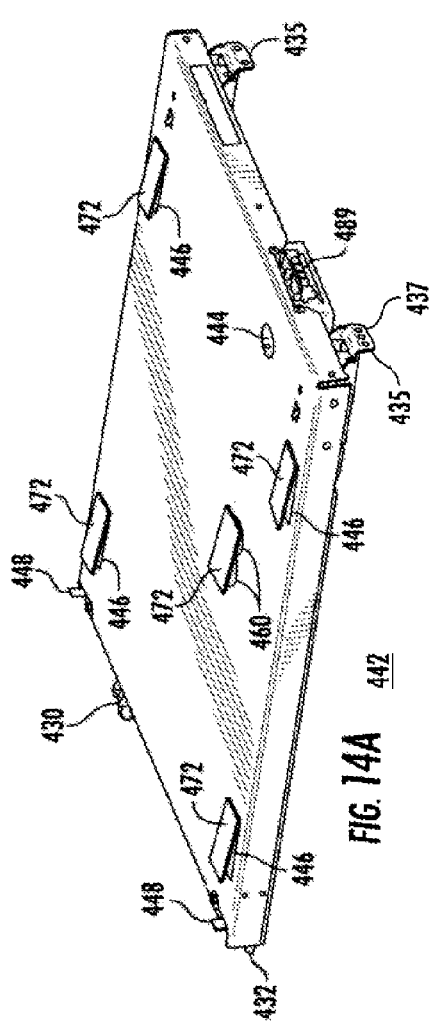
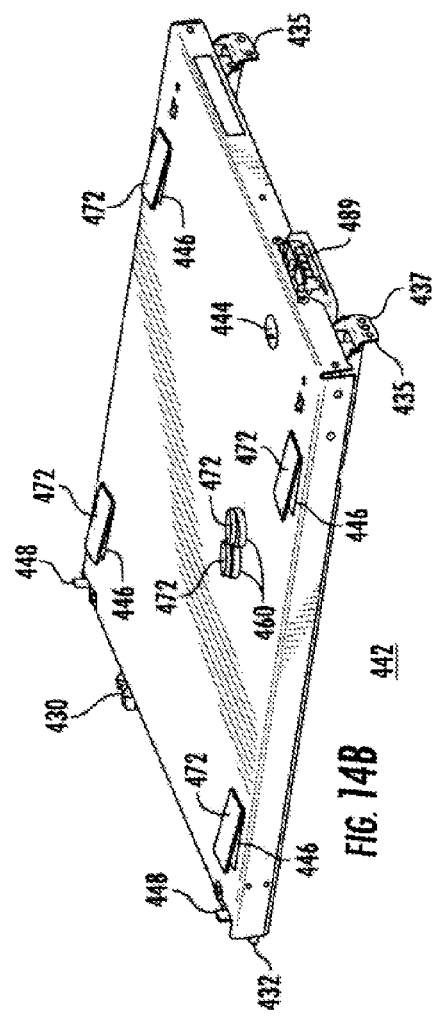

HOUSEHOLD APPLIANCE HAVING A WARMING DRAWER WITH A THERMALLY CONDUCTIVE LAYER

CROSS-REFERENCES TO RELATED APPLICATIONS

This application is related to Applicants' co-pending U.S. applications, which are filed concurrently herewith, entitled "HOUSEHOLD APPLIANCE HAVING A DEPLOYABLE WARMING DRAWER MODULE", Ser. No. 13/483098; "HOUSEHOLD APPLIANCE HAVING A DRIP GUARD FOR A WARMING DRAWER", Ser. No. 13/483096; "HOUSEHOLD APPLIANCE HAVING A THERMOSTAT RETAINER FOR A THERMOSTAT OF A WARMING DRAWER", Ser. No. 13/483092; "HOUSEHOLD APPLIANCE HAVING EMBOSSES SUPPORTING A GLASS HEATING ELEMENT OF A WARMING DRAWER", Ser. No. 13/483094, each of which is incorporated herein by reference in its entirety.

FIELD OF THE INVENTION

The present invention is directed to a household appliance having a warming drawer, and more particularly, to a household appliance having a thermally conductive layer under a glass heating element of a warming drawer.

BACKGROUND OF THE INVENTION

Some conventional household appliances may include a warming drawer for warming one or more items P such as food, cookware, cutlery, etc. or maintaining a predetermined temperature of the items. As shown for example in FIG. 1, a conventional warming drawer 1 commonly may include a housing 2 and a drawer 4 having four walls 6, a floor 8, and a handle 10, similar to an ordinary drawer. The drawer 4 may be slidably coupled to the housing 2 by ordinary drawer slides 12 mounted on the interior sidewalls of the housing 2 or to the floor of the housing 2. The functional parts of the warming drawer commonly are attached to the housing 2 of the warming drawer 1. For example, a heating element 14 commonly is fixed to the interior of the housing 2, such as on the floor of the housing 2. In operation, the drawer 4 moves over the heating element 14 when the drawer 4 is in a closed position inside the housing 2 to heat the items P in the drawer 4. The controls (not shown) for the conventional warming drawer commonly are provided on the warming drawer housing 2 or on the housing of the appliance.

SUMMARY OF THE INVENTION

The present invention is directed to a warming drawer having a thermally conductive layer between the sensor of a thermostat and the underside of a heating element, thereby improving thermal contact between the sensor and the underside of the heating element and ensuring an accurate determination of a true temperature of the heating element by the thermostat. In this way, the present invention can provide simple, easy to manufacture, and inexpensive means for improving the thermal conductivity between a thermostat and an underside of the heating element, which may ensure that a power supply to the heating element can be interrupted or shut off in time to prevent damage or overheating if a temperature exceeds a predetermined threshold, or that an accurate and true temperature can be provided by the thermostat to a control unit such that the control unit accurately can control the operation of the heating element. The exemplary embodiments also may simplify the manufacturing process and reduce an amount of labor, time, and manufacturing costs by providing a single sheet that covers the entire plate and/or providing adhesive on one or both side of the heat conductive sheet, film, or tape. The exemplary embodiments also may provide an additional advantage of eliminating a need for other insulation means between the support plate and the heating element.

Prior to describing the exemplary embodiments in greater detail, and to provide a better understanding of the invention, this disclosure will first describe some of the problems with conventional warming drawer designs and other background information with respect to the warming drawer designs, along with an explanation of the reasons for improving the arrangement of the warming drawer and the corresponding advantages provided by the present invention.

The conventional warming drawer having a heating element fixed to the interior of the housing and the warming drawer moving over the heating element when the warming drawer is moved to a closed position may have limited or reduced heat transfer between the heating elements and the warming drawer and the contents of the warming drawer and the heat transfer may vary for different positions in the drawer, thereby resulting in hot spots in the drawer. Assembly and repair work for components of such a warming drawer commonly may be difficult to perform particularly where the appliance is installed in cabinetry. The assembly of the parts of the warming drawer within the warming drawer housing during manufacturing also can be complex and time-consuming.

To solve the foregoing problems, a warming drawer has been provided in which functional parts of the warming drawer are assembled together into a sub-assembly or warming drawer module that easily can be inserted and removed from the warming drawer housing by manufacturing personnel, a user, or a repair technician. A heating device may be coupled to and movable with the warming drawer module in and out of the housing. In this way, the warming drawer module can improve heat transfer, and provide more uniform and predictable heat transfer, between the heating element and the contents of the warming drawer module, thereby providing uniform heating at various positions in the drawer and reducing or eliminating hot spots in the warming drawer module. The warming drawer module also can simplify and improve the ease with which assembly and repair work can be performed for components of the warming drawer by enabling the warming drawer module to be removed from the warming drawer housing with a simple connection such that a user or technician can easily and simply perform repairs, replacement, and/or cleaning without having to remove the warming drawer housing. Electrical and control wires and cable, as well as wire and cable routing features, also may be coupled to or included in the deployable warming drawer module so that manufacturing personnel, a user, or a repair technician do not have to route wires or cables when installing and/or removing the warming drawer module.

The heating device of the warming drawer module may be provided by a ceramic/glass heating element that forms a floor surface of the module for receiving the items to be warmed and that provides uniform heat across the entire floor surface of the warming drawer, while also being easy to clean and providing an aesthetically pleasing appearance, for example, when the drawer is deployed form the warming drawer housing. In this case, the underside of the glass commonly has a thin metal layer or conductive film which, when supplied with an electric current, generates heat evenly across the entire surface of the ceramic/glass heating element. As a result, the entire surface of the ceramic/glass heating element can generate heat and form a portion of an electrical circuit.

The underside of the ceramic/glass heating element can be supported by support means, such as a plurality of embosses, to minimize or prevent damage to the ceramic/glass heating element from the force (e.g., weight) of the items being exerted on the upper surface of the ceramic/glass heating element. Since the ceramic/glass heating element functions both as a floor surface and as a heated surface for warming the items, and since the underside of the entire ceramic/glass heating element forms part of the electric circuit, the support means can support the ceramic/glass heating element in a manner that protects the heating element while also minimizing heat transfer away from the ceramic/glass heating element downward and away from the items (which is an undesired direction for heat transfer for the warming drawer) and correspondingly minimizing an amount of contact area that needs to be electrically insulated from the underside of the glass/ceramic heating element. The support means can control a height of the glass/ceramic heating element above a surface of a support plate (i.e., suspend the heating element above the support plate) to provide a predetermined height or clearance for routing wires, such as the wires from the heating element, in the space between the glass/ceramic heating element and the metal support plate.

By controlling the predetermined height or clearance, the support means also can provide an area under the glass/ceramic heating element for mounting a thermostat for monitoring a temperature of the heating element. The thermostat can be mounted under the glass/ceramic heating element such that a sensing surface of the thermostat is in contact with the underside of the glass/ceramic heating element to detect a temperature of the heating element, for example, to interrupt power to the heating element if the heating element exceeds a predetermined temperature or to provide control signals to a control unit for controlling the heating element. More particularly, the thermostat can be supported, for example, by a thermostat retainer under the glass/ceramic heating element such that a sensing surface of the thermostat is in contact with the underside of the glass/ceramic heating element.

The present invention recognizes that sufficient thermal contact is needed between the thermostat and an underside of the glass/ceramic heating element in order to monitor the true and accurate temperature of the glass heating element, for example, such that the thermostat, control unit, other device can interrupt or disconnect the power supply to the heating element when a predetermined temperature is reached in time to prevent damage or overheating of the heating element, or to provide a signal to a control unit of the warming drawer for limiting or regulating the temperature of the heating element, such as controlling the operation of the heating element (e.g., On and OFF operation) in order to provide the selected temperature setting. An accurate determination of the true temperature of the heating element can permit the thermostat, control unit, or other device to interrupt or disconnect the power supply to the heating element when a predetermined temperature is reached in time to prevent damage or overheating of the heating element, or permit the control unit to consistently and accurately heat the heating element to the selected temperature setting from one use to another use. In this way, a user can accurately select an appropriate temperature setting with an expectation that the warming drawer will function and heat the items to be warmed consistently from one use to the next use.

The exemplary embodiments can provide means for improving the thermal conductivity between the thermostat and an underside of the glass/ceramic heating element and ensuring that a temperature limiting and regulating thermostat is capable of detecting an accurate and true temperature of the heating element. In this way, the means for improving thermal conductivity may minimize or prevent a risk of the heating element exceeding a predetermined temperature that may result in damage or overheating of the heating element. For example, in an embodiment, the thermostat can be wired in series with the heating element and the power supply and configured to interrupt or disconnect the power supply path to the heating element when a predetermined temperature is reached at the thermostat. If a temperature of the heating element exceeds a predetermined maximum temperature or temperature threshold during operation, then the thermostat may open the power circuit to the heating element, thereby interrupting the power supply to the heating element and preventing overheating of the heating element. The means for improving the thermal conductivity between the thermostat and an underside of the glass/ceramic heating element can improve the temperature detection by the thermostat, which may ensure that the thermostat is capable of detecting the true temperature of the heating element and shut off power to the heating element in time to prevent damage or overheating. In this example, a control unit may not receive any feedback from the thermostats at all, and may continue to supply power to the heating element, with the thermostat being responsible for interrupting power to the heating element when the predetermined temperature is reached. Instead, the control unit of the warming drawer optionally can be configured to control the operation of the heating element based on an air temperature obtained by a separate air temperature sensor (e.g., an RTD air temp sensor; not shown) disposed in the warming drawer, such as at the back of the warming drawer. In this way, the means for improving thermal conductivity can enable the thermostat to consistently and accurately monitor the temperature of the heating element and/or minimize or prevent a risk of the heating element exceeding a predetermined temperature that may result in damage or overheating of the heating element without a control unit. In another embodiment, the control unit of the warming drawer can be additionally or alternatively configured to receive temperature information from the thermostat such that the control unit can control the operation of the heating element based on the temperature obtained by the thermostat and/or that the control unit can shut down the heating element, if needed, prior to an occurrence of damage to, or overheating of, the heating element or the warming drawer, or adjacent components of the appliance.

More particularly, an exemplary embodiment is directed to a heat conductive sheet, film, or tape that can be disposed between a sensing surface of a thermostat and an underside of the heating element. The heat conductive sheet, film, or tape can include adhesive on one or both sides and/or can be mounted in compression between the sensing surface of the thermostat and the underside of the heating element to minimize or prevent an interruption in the thermal conductivity between the sensing surface of the thermostat and the underside of the heating element, thereby providing improved thermal contact between thermostats and heater element and permitting the thermostat to detect the heating elements true/full temperature (i.e., without temperature loss). By providing the optional adhesive on one or both side of the heat conductive sheet, film, or tape, the exemplary embodiments can reduce manufacturing time and complexity further while also providing for a cleaner installation, for example, by minimizing over application or excess application of other adhesives such as heat sink paste.

The present invention recognizes that electrically insulating materials that commonly are used for heat sink applications, such as for mounting a heat sink in electronics, may be rated to safely reach high temperatures, such as the temperatures achieved by the heating element of a warming drawer. The present invention deviates from common and accepted applications of these electrically insulating materials to provide improved thermal conductivity directly between a surface of the thermostat and a surface of the heating element. The thermally conductive sheet or thermally conductive tape can include, for example, a UL (Underwriter Laboratories) rated material that is rated to safely reach temperatures corresponding to the temperatures of the heating element and warming drawer, such as a UL listed silicone electrically insulating material manufactured, for example, by 3M®, and which commonly may be used for heat sink applications.

An exemplary embodiment is directed to a warming drawer having a thermally conductive layer, such as a thermally conductive sheet, between the sensor of each thermostat and the underside of the heating element, thereby improving thermal contact between the sensor of each thermostat and the underside of the heating element, and ensuring an accurate determination of a true temperature of the heating element. The thermally conductive sheet can be disposed over the entire support plate or at least the contact points between the thermostats and the conductive underside of the glass heating element. In an assembled state, the thermally conductive sheet can be held in compression between the conductive underside of the glass heating element and the thermostats. The sheet can include one or more openings corresponding to one or more openings on the support plate, such as one or more openings for passing the wires from the heating element to a wire guide or channel on an underside of the support plate.

The thermally conductive layer can be formed from a material having low thermal resistance (i.e., thermally conductive). The material forming the thermally conductive layer also advantageously may have high electrical resistance properties. While the thermally conductive sheet is intended to improve the thermal conductivity between the thermostat and the heating element, in an example in which the thermally conductive sheet is disposed over the entire support plate, a portion of the thermally conductive sheet also may be disposed between the embosses and the glass heating element. In this case, the thermally conductive sheet also may electrically insulate the embosses from the conductive underside of the glass heating element. The present invention recognizes that ordinarily an increase in thermal conductivity between the embosses and the heating element may not be desirable. However, the benefits of electrically insulating the embosses from the heating element may outweigh the promotion of thermal conductivity between the embosses and the heating element. Accordingly, the exemplary embodiments of the thermally conductive sheet can improve the thermal conductivity between the thermostat and the heating element while providing an additional advantage of electrically insulating the embosses for supporting the heating element from the electrical conductive underside of the heating element.

The thermally conductive sheet can be placed over the support plate without securing means for holding the sheet in place such that the sheet is held in place solely by the compression forces exerted on the sheet by the thermostat and/or the embosses pressing against the underside of the heating element and compressing the sheet therebetween. In other embodiments, the thermally conductive sheet can include, for example, an adhesive layer on one or both sides. For example, the adhesive layer can include a 'peel-and-stick' adhesive layer or other type of adhesive layer, for example, such as adhesives used for heat sinks. The sheet can include adhesive over an entire surface of the sheet, or in particular location, such as along one or more edges or a location corresponding to the location of the thermostats and/or embosses.

In other embodiments, the thermally conductive layer can include individual portions of thermally conductive film or tape at each location of the thermostats, instead of a sheet. The individual portions of thermally conductive tape can be disposed over each of the contact points between the conductive underside of the glass heating element and the thermostats. In an assembled state, the thermally conductive film or tape can be held in compression between the conductive underside of the glass heating element and the thermostats. The thermally conductive tape can include, for example, an adhesive layer on one or both sides. For example, the adhesive layer can include a 'peel-and-stick' adhesive layer or other type of adhesive layer, for example, such as an adhesive used for heat sinks. In an embodiment, the thermally conductive tape can include an adhesive layer on a first side, such that the adhesive on the first side of the tape can be adhered to a top of a thermostat, thereby assuring sufficient contact between the thermally conductive tape and the thermostat and maintaining the correct position of the thermally conductive tape during assembly. In another an embodiment, the thermally conductive tape can include an adhesive layer on both sides, such that the adhesive on the first side of the tape can be adhered to a top of a thermostat and the adhesive on the second side of the tape can be adhered to the underside of the heating element, thereby assuring sufficient contact between the thermally conductive tape and the thermostat and the underside of the heating element, and maintaining the correct position of the thermally conductive tape during assembly. In other embodiments, the thermally conductive tape may not include an adhesive layer and may be held in place solely by the compression forces exerted on the tape by the thermostat pressing against the underside of the heating element and compressing the tape therebetween when the warming drawer is in an assembled state.

The thermally conductive tape can have a size a shape that covers, or at least corresponds to, a size and shape of one or more thermostats. For example, the thermally conductive tape can have a rectangular, circular, oval, triangular, or square shape etc. that corresponds to a shape of, and covers, one or more thermostats.

As explained above, while the thermally conductive film or tape is intended to improve the thermal conductivity between the thermostat and the heating element, the thermally conductive tape also can have electrically insulative properties. Accordingly, in other embodiments, the thermally conductive layer also can include individual portions of film or tape disposed over each of the contact points between the conductive underside of the glass heating element and the embosses. In an assembled state, the film or tape can be held in compression between the conductive underside of the glass heating element and the embosses. In this instance, the tape similarly can include an adhesive layer on one or both sides, such as a 'peel-and-stick' adhesive layer or other type of adhesive layer (e.g., an adhesive used for heat sinks). In other embodiments, the tape may be held in place solely by the compression forces exerted on the tape by the embosses pressing against the underside of the heating element and compressing the tape there between when the warming drawer is in an assembled state. These portions of tape can have a size a shape that covers, or at least corresponds to, a size and shape of one or more embosses. For example, the tape can have a rectangular, circular, oval, triangular, or square shape etc. that corresponds to a shape of, and covers, one or more embosses.

According to the exemplary embodiments, the present invention can improve the thermal conductivity between the thermostat and an underside of the glass/ceramic heating element, thereby ensuring that temperature limiting and regulating thermostat obtains an accurate determination of the true and full temperature of the heating element. In this way, the present invention can improve the temperature detection by the thermostat, which may ensure that the thermostat is capable of detecting the true and full temperature (i.e., with limited temperature loss or without temperature loss) of the heating element such that the thermostat and/or the control unit can shut down or interrupt the power supply to the heating element in time to prevent an occurrence of damage to, or overheating of, the heating element or the warming drawer, or adjacent components of the appliance.

The exemplary embodiments of the present invention may simplify the manufacturing process and reduce labor and time for manufacturing, thereby reducing manufacturing costs, for example, by providing a single sheet that covers the entire plate, providing adhesive on one or both side of the heat conductive sheet, film, or tape, while also providing for a cleaner installation, for example, by minimizing over application or excess application of other adhesives or eliminating the need for other insulation means between the support plate and the heating element.

In the exemplary embodiments, a household appliance can include a warming drawer with a fixed warming drawer module and glass heating element or a warming drawer module having a glass heating element that is movable in and out of a warming drawer housing.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 9A is a perspective view of a support plate according to an exemplary embodiment of the invention, and FIG. 9B is an enlargement of a portion of the support plate in FIG. 9A.

FIGS. 10A-10C are schematic partial side views of emboss profiles according to exemplary embodiments of the invention.

FIGS. 12A and 12B are a schematic plan view and a perspective view, respectively, of support plates having embosses according to exemplary embodiments of the invention.

FIG. 13A is a perspective view of a support plate and FIG. 13B is a perspective view of a support plate having a thermally conductive sheet, according to an exemplary embodiment of the invention.

FIGS. 14A and 14B are perspective views of a support plate having a thermally conductive tape, according to an exemplary embodiment of the invention.

DETAILED DESCRIPTION OF THE EXEMPLARY EMBODIMENTS OF THE INVENTION

Figure 1:
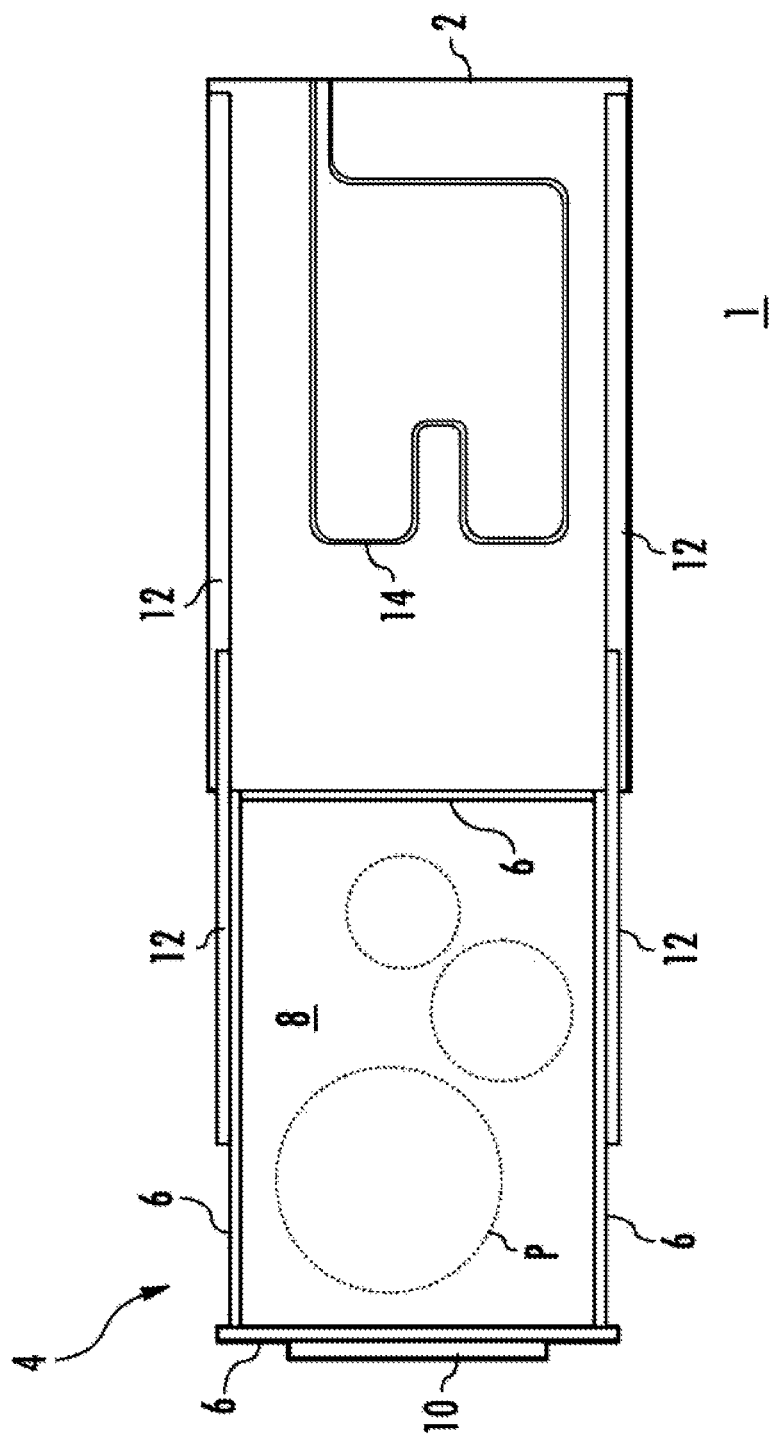
FIG. 1 is a plan view of a conventional household appliance having a warming drawer.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 2-15C illustrate exemplary embodiments of a household appliance having a thermally conductive layer under a glass heating element of a warming drawer. Prior to describing the exemplary embodiments of the thermally conductive layer in greater detail, and to provide a better understanding of the invention, this disclosure will first describe an exemplary warming drawer assembly that derives particular advantages from the thermally conductive layer according to the present invention.

Figure 2:
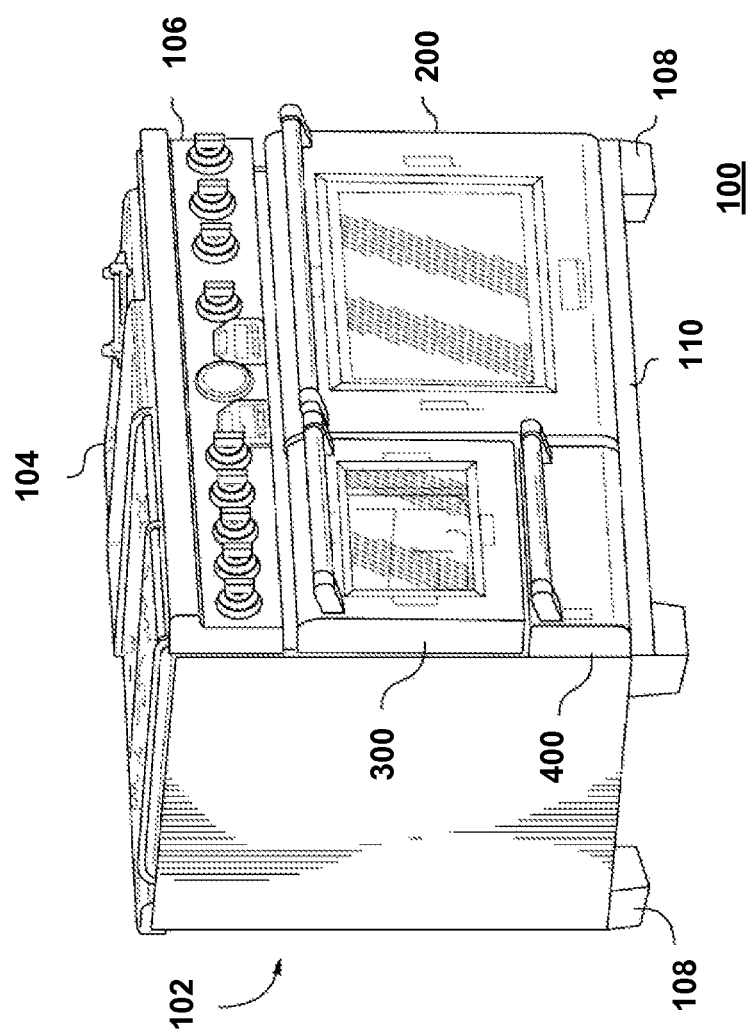
FIG. 2 is a perspective view of a household appliance according to an exemplary embodiment of the invention.

With reference to FIG. 2, an exemplary household appliance 100 can include a cooking range having a housing 102 including one or more cooking or warming devices, such as a cooktop, gas oven, electric oven, steam oven, convection oven, and/or warming drawer. In other embodiments, the appliance 100 can include one or more oven cooking chambers without a cooktop. In other embodiments, the appliance 100 can include a standalone appliance, wall mounted appliance, or countertop appliance, such as a stand-alone warming drawer, wall mounted warming drawer, or countertop warming drawer. The appliance housing 102 can include, for example, a cooktop 104 and control panel 106. The cooktop 104 can include, for example, a gas cooktop having a plurality of gas burners, or other types of cooktops, such as an electric cooktop, an induction cooktop, or the like. The exemplary household appliance 100 can include one or more doors, such as a baking oven door 200, a steam oven door 300, and/or a warming drawer door 400 for providing access to one or more chambers of the housing 102. The housing 102 can include pedestal feet 108 for example for supporting the stand alone appliance and a kick panel 110.

Figure 3:
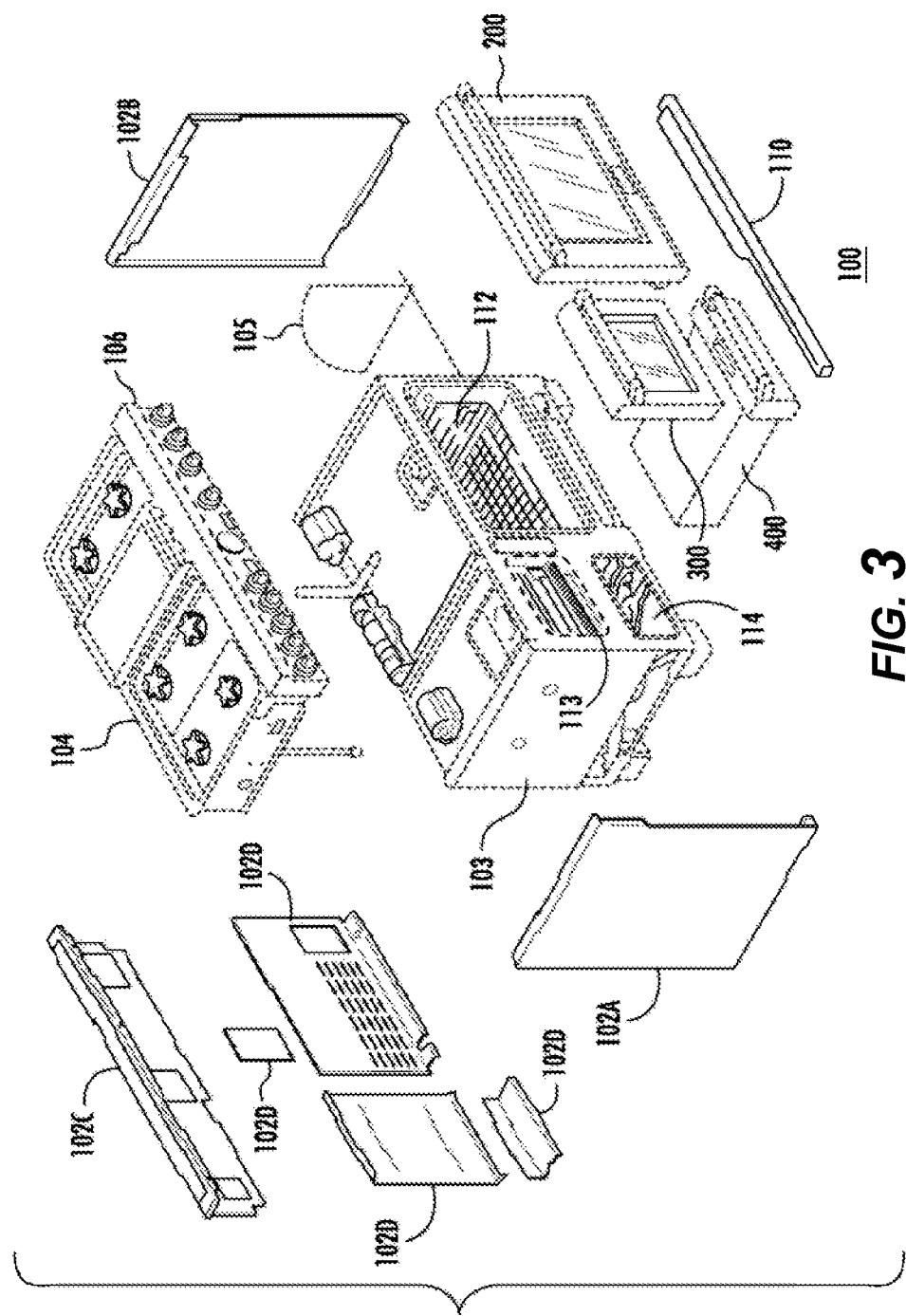
FIG. 3 is an exploded view of a household appliance according to an exemplary embodiment of the invention.

Referring to FIG. 3, the housing 102 of the exemplary household appliance 100 shown in FIG. 2 further can include, for example, left-hand and right-hand sidewalls 102A, 102B and one or more rear panels 102D on a frame 103. The exemplary appliance 100 can include other devices and features, such as, for example, a backsplash 102C, hideaway label plate 105, etc. The frame 103 can include one or more chambers for cooking or warming devices, such as a baking oven chamber 112, steam oven chamber 113, and/or warming drawer chamber 114.

Figure 4:
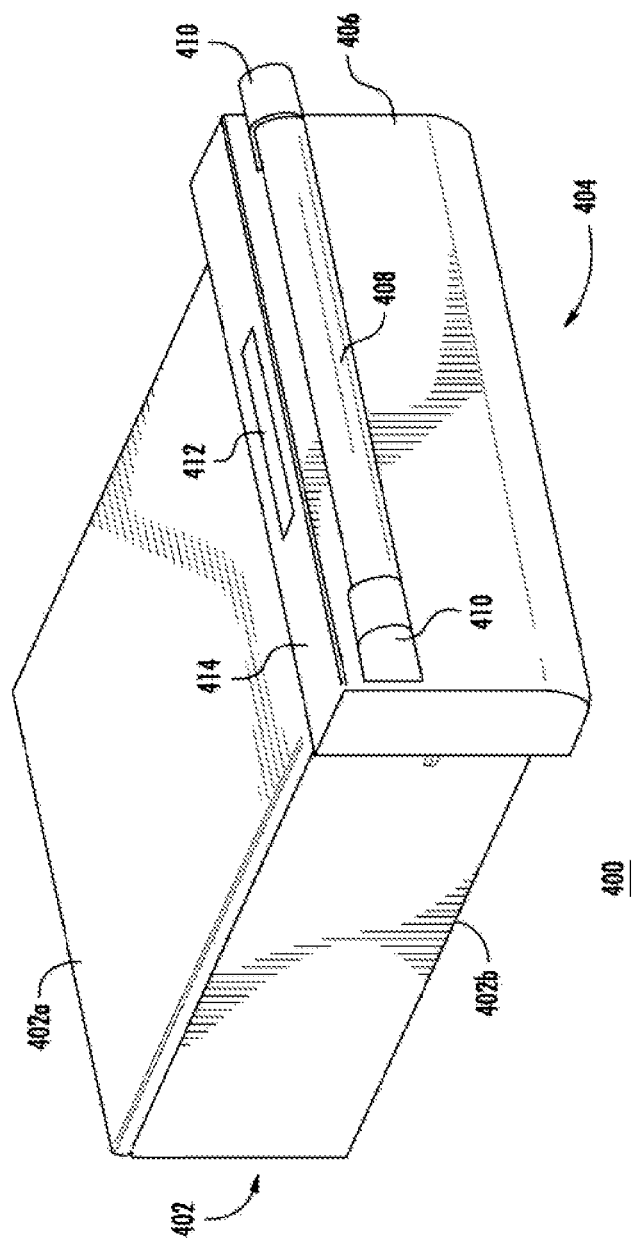
FIG. 4 is a perspective view of a warming drawer according to an exemplary embodiment of the invention.

With reference to FIG. 4, an exemplary embodiment of a modular warming drawer 400 will now be described in which the functional components of the warming drawer are deployable from within a fixed warming drawer housing.

Figure 6:
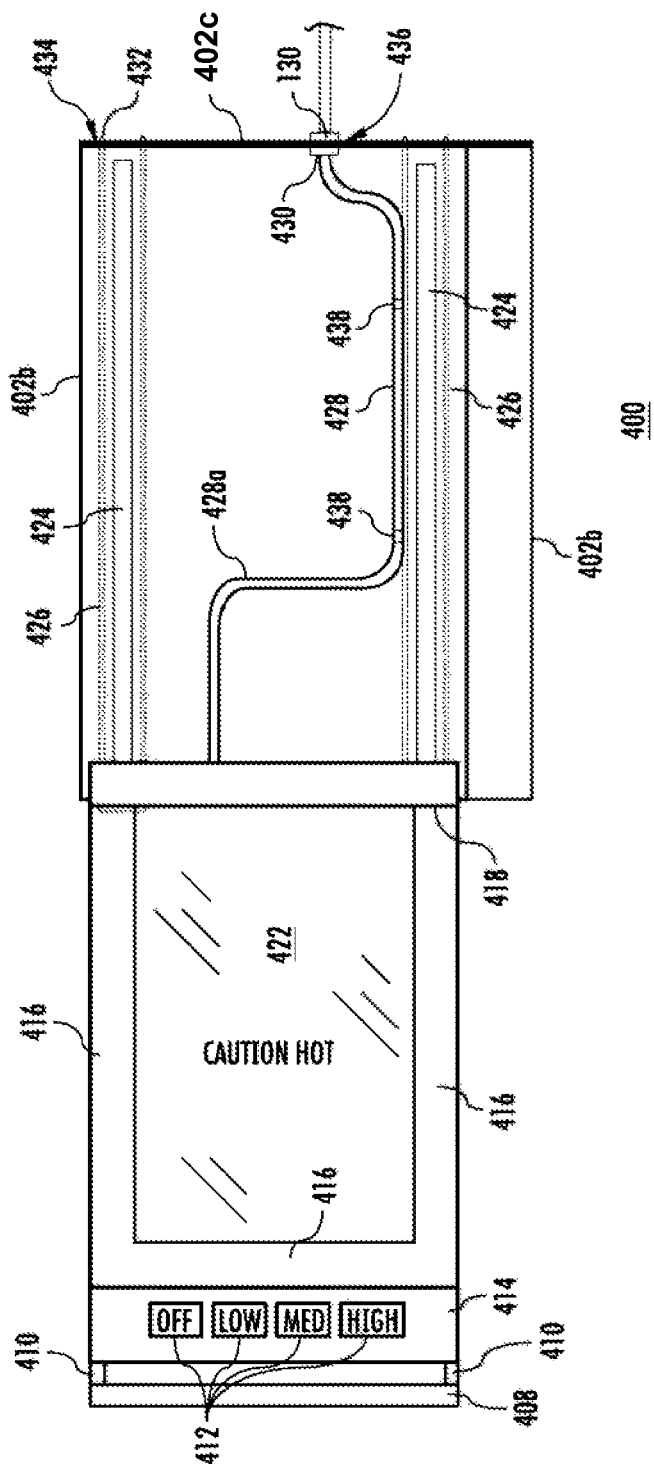
FIG. 6 is a plan view of a warming drawer having a deployed warming drawer module according to an exemplary embodiment of the invention.

The modular warming drawer 400 can include, for example, a fixed warming drawer housing 402 having a top 402a, a bottom (not visible in FIG. 4), sidewalls 402b, and a rear wall (not visible in FIG. 4). The top, bottom, sidewalls, and/or rear wall of the warming drawer housing 402 can be, for example, stainless steel panels. The warming drawer housing 402 can be disposed in the warming drawer chamber 114 shown in FIG. 3. The modular warming drawer 400 can include, for example, a deployable warming drawer module 404 having a front panel 406, a handle 408 coupled to the front panel 406 via, for example, handle mounts 410. The front panel 406 and other portions thereof can include, for example, one or more stainless steel panels. The deployable warming drawer module 404 can include, for example, a control panel 412 for controlling the functions of the warming drawer module 404. The control panel 412 can be, for example, a concealed control panel on or recessed within the upper surface 414 of the front panel 406, which is visible to a user only when the warming drawer module 404 is in a deployed position, as illustrated in FIG. 6 described in greater detail below. In other embodiments, the control panel 412 can be on or recessed within the face of the front panel 406 or a side of the front panel 406. The control panel 412 can include, for example, one or more touch-activated switches for controlling an operation of the warming drawer 400, such as, for example, an 'OFF' setting, a 'LOW' setting, a 'MED' setting, and a 'HIGH' setting.

Figure 5:
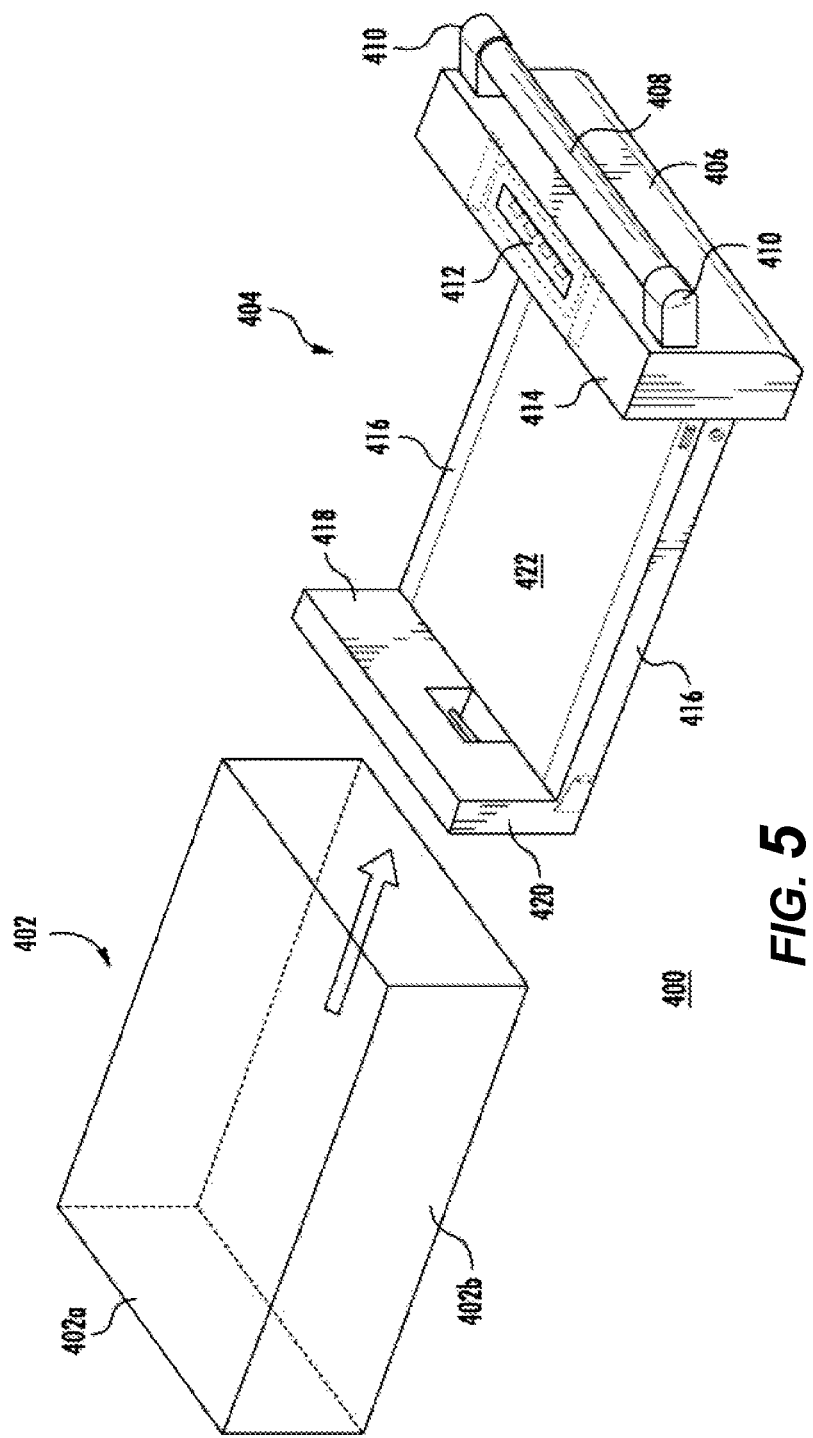
FIG. 5 is a partially exploded perspective view of a warming drawer according to an exemplary embodiment of the invention.

With reference to FIGS. 5 and 6, the exemplary warming drawer module 404 can include a frame 416 coupled to the front panel 406, and a rear panel 418 coupled to an opposite end of the frame 416, for example, via a bracket portion 420 (which may be formed separately or integrally with the rear panel 418). The exemplary warming drawer module 404 can include a heating device, such as a sheet glass or glass/ceramic heating element 422, which is disposed in or supported by the frame 416. The sheet glass or glass/ceramic heating element 422 can form a floor surface of the warming drawer module 404, such as a warming surface for supporting (e.g., directly supporting) items to be warmed. The heating element 422 can be supplied with power from a power source and controlled by the control panel 412 to selectively provide one or more predetermined temperatures for the warming area in the warming drawer module or the floor surface of the warming drawer module. Exemplary embodiments of a heating element is described in greater detail with reference to FIG. 8. The warming drawer module 404 can be, for example, slidably deployable from within the warming drawer housing 402 using various arrangements of various types of drawer slides.

With reference again to FIGS. 5 and 6, the warming drawer module can be configured without sidewalls (e.g., without a left-hand sidewall or right-hand sidewall) connecting the front panel 406 to the rear panel 418, thereby improving and simplifying a user's access to the warming area, and particularly to the heating element 422, for example, for loading and unloading plates, cookware, cutlery, and/or food into and out of the warming drawer module 404. In other embodiments, the warming drawer can include a left-hand sidewall or a right-hand sidewall connecting at least one side of the front panel 406 to the rear panel 418. In still other embodiments, the warming drawer can include a left-hand sidewall and a right-hand sidewall connecting both sides of the front panel 406 to the rear panel 418. In another embodiment, the warming drawer module 404 can include only the front panel 406 without a left-hand sidewall, right-hand sidewall, or rear panel 418. The frame 416 and optional rear panel 418 and/or side panels can be, for example, stainless steel panels.

As shown in FIGS. 5 and 6, the exemplary warming drawer module 404 can be movable in a direction (shown by an arrow in the exploded view of FIG. 5) from a first position (e.g., a stored position as shown in FIG. 4) within the warming drawer housing 402 to a second position, such as a deployed position (e.g., as shown in FIG. 6) that is at least partially outside of the warming drawer housing 402 and that permits access to an interior of the warming drawer module 404 (e.g., access to the glass/ceramic heating element 422) or access to concealed controls (if equipped)(e.g., 412) of the warming drawer module 404, as exemplarily illustrated in FIGS. 5 and 6. The deployed position can include various partially or fully deployed positions of the warming drawer module 404 with respect to the warming drawer housing 402 and is not limited to the illustrated positions in the Figures.

As shown in FIGS. 5 and 6, the exemplary warming drawer module 404 can include one or more functional components (e.g., heating element 422, electrical wires 428, and/or control components 412) of the warming drawer 400 such that one or more of these functional components move with the warming drawer module 404 between the first position and the second position. The controls of the warming drawer 400 can be disposed on (i.e., on-board) the warming drawer module 404 such that the controls 412 are accessible when the warming drawer module 404 is in a deployed position and concealed by the appliance housing or another door on the appliance housing when the warming drawer 400 is in the first (i.e., closed) position. In other embodiments, the controls can be electrically connected to the warming drawer module 404 but remotely located from the warming drawer module 404, such as on the warming drawer housing 402, the housing (102 in FIG. 2) of the appliance 100, the control panel (106 in FIG. 2) of the appliance 100, etc.

The exemplary warming drawer module 404 can be movable further in the direction shown in FIG. 5 from the first position to a third position in which the warming drawer module 404 is removed completely from the warming drawer housing 402, such that the functional components (e.g., all of the functional components) of the warming drawer 400 are accessible to a user or a repair technician.

With reference to FIG. 6, an exemplary warming drawer module 404 is illustrated in a deployed position (e.g., a fully deployed position). The warming drawer module 404 can include one or more slides 424 for facilitating movement of the warming drawer module 404 (including the functional components, such as the heating element 422) between the stored position in the warming drawer housing 402 and the deployed position outside of the warming drawer housing 402. The slides 424 can be coupled, for example, directly to a part of the warming drawer housing 402, such as the floor for the warming drawer housing 402. The warming drawer module 404 optionally can include means for increasing the rigidity and stiffness and reducing deflection of the warming drawer module 404, such as one or more channels or supports 426 (shown with dashed lines)(e.g., channels or supports having a U-shaped, I-shaped, T-shaped, L-shaped, square-shaped, rectangular-shaped, circular-shaped, or oval-shaped cross-section) to increase the rigidity of the warming drawer module 404, stiffen the slide mounting, reduce deflection of a part of the warming drawer housing 402 or the warming drawer module 404, etc., particularly when the warming drawer module 404 is in a deployed position and/or in a loaded position. A drawer slide 424 can be coupled to the frame 416 of the warming drawer module and to the channels 426, which in turn can be coupled to the warming drawer housing 402 at one or more locations (e.g., floor, sidewall, rear wall, and/or frame of the warming drawer housing 402). In this way, the warming drawer module 404 can be coupled to the warming drawer housing 402 via one or more channels 426.

As shown in FIG. 6, a channel 426 can include one or more locking features or means for securing the channel 426 to the warming drawer housing 402, for example, one or more protrusions 432 on an end of the channel that engage an opening 434 in a rear panel 402c of the warming drawer housing 402. The locking feature or means can include one of more openings (not shown) formed in a portion of a front end of the channel 426 for receiving a fastening device and securing the front end of the channel 426, or another portion of the channel 426, to a part of the warming drawer housing 402 that can be easily accessed by a user or technician from a front area of the warming drawer 400 without removing the warming drawer module 404 or warming drawer housing 402.

The warming drawer module 404 can include a cable harness 428 for guiding one or more electrical wires or cables and/or data wires or cables to one or more components or parts of the warming drawer module 404, or one or more individual or bundled wires and/or cables. One or more of the wires or cables can include an electrical connection 430 that is electrically coupled to an electrical connection 130 of the household appliance 100, such as an electrical connection to a power supply connection, data connection, or control connection of the household appliance 100. The electrical connection 130 can be mounted in an opening 436 in the rear panel 402c of the warming drawer housing 402, as shown in FIG. 6. The warming drawer module 404 also can include cable routing or management devices such that users or repair technicians do not need to route wires or cables when installing and/or removing/repairing the functional parts of the warming drawer module 404. For example, the cable harness 428 can be coupled to one or more of the channels 426 at one or more locations using one or more coupling devices 438 (e.g., cable ties, clamps, or the like) to prevent snagging or kinking of the cable harness 428 and/or wires/cables during movement of the warming drawer module 404 in and out of the warming drawer housing 402. The cable harness 428 can be provided with a freely bendable and movable portion 428a having sufficient length (e.g., slack) to permit the moveable portion of the warming drawer module 404 to move in and out of the warming drawer housing 402 between the stored position and the deployed position without disconnecting the electrical, data, or power supply connection (e.g., 430) of the warming drawer module 404 from the corresponding electrical connection 130 of the warming drawer housing 402.

As shown in FIG. 6, many or all of the functional components of the warming drawer 400, such as the glass/ceramic heater element 422 and controls 412, can be on the movable portion of the warming drawer module 404 such that the functional components move with the movable portion of the warming drawer module 404 in and out of the warming drawer housing 402.

Figure 7:
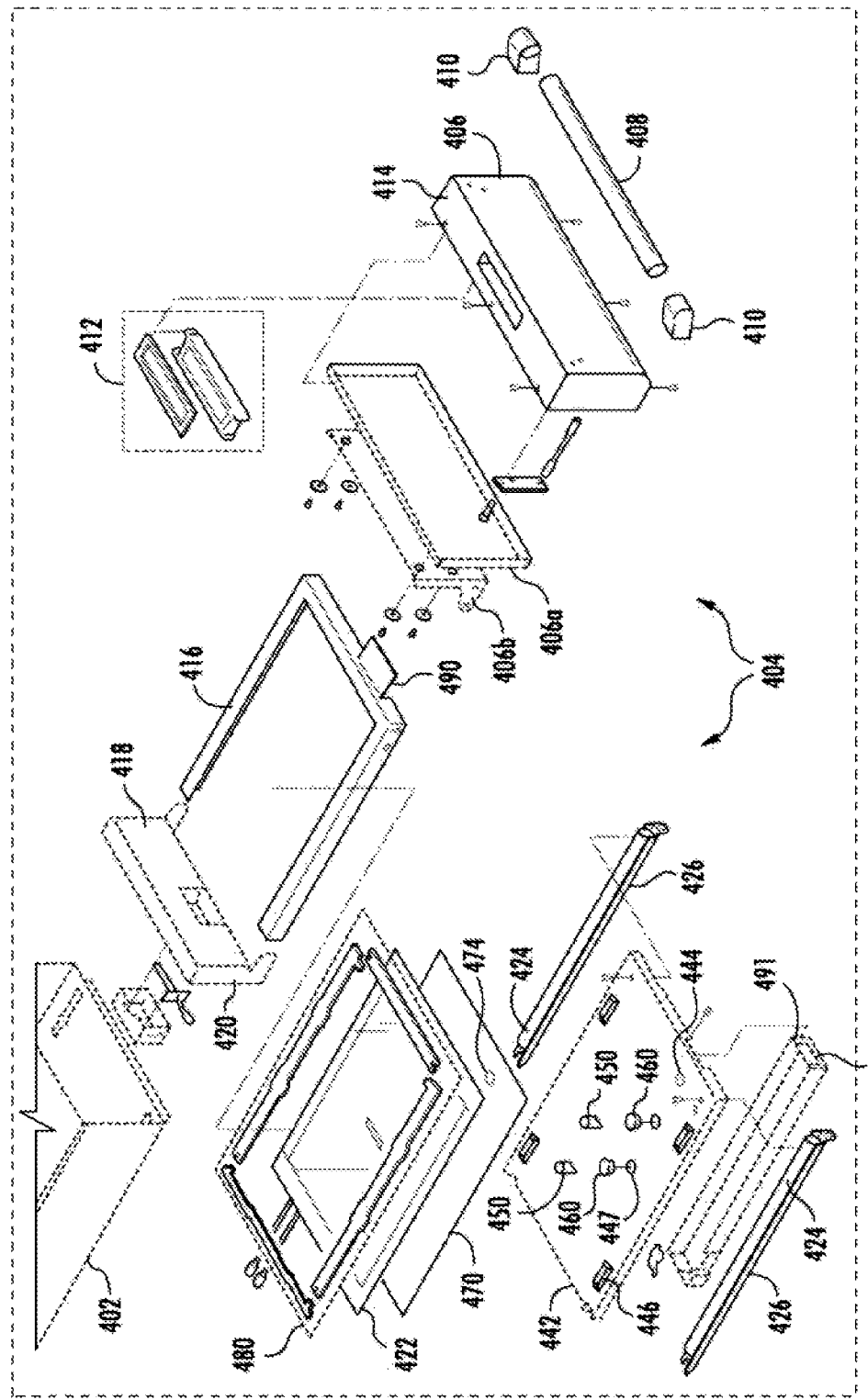
FIG. 7 is an exploded, perspective view of a warming drawer according to an exemplary embodiment of the invention.

With reference to FIG. 7, an exemplary embodiment of a warming drawer 400 will now be described in greater detail.

The exemplary warming drawer 400 can include, for example, a warming drawer housing 402 and a warming drawer module 404, shown in an exploded view. The warming drawer module 404 can include a front panel 406 having a handle 408 coupled to the front panel 406 via handle mounts 410. The front panel 406 can include a control panel 412 disposed in an opening or recess in an upper surface 414 of the front panel 406. The front panel 406 can include a rear portion 406a that encloses a rear side of the front panel 406 and a bracket 406b for coupling the rear portion 406a to a front portion of a frame 416 of the warming drawer module 404. A rear portion of the frame 416 can be coupled to a rear panel 418 via bracket portions 420 (which may be formed separately or integrally with the rear panel 418).

As explained above, the warming drawer 400 can include a heating device assembly including a ceramic/glass heating element 422, which is described in greater detail with reference to FIG. 8. The ceramic/glass heating element 422 forms the floor of the warming drawer module 404, and thus, will be directly loaded with plates, cookware, cutlery, food, etc. To support an underside of the ceramic/glass heating element 422, a support plate 442 (e.g., stainless steel support plate) can be provided to support the glass heating element 422. The support plate 442 can include one or more supporting features, such as a plurality of embosses 446, for supporting the glass heating element 422 a predetermined distance above the support plate 442 and minimizing thermal and electrical contact areas between the heating element 422 and the support plate 442. Exemplary embodiments of a support plate having embosses is described in greater detail with reference for FIGS. 9A-11D. The support plate 442 also can include one or more openings 447 for receiving one or more thermostat retainers 460 that support and fix one or more thermostats 450 in a predetermined position and height above the surface of the support plate 442 and against the underside of the glass heating element 422.

A thermally conductive sheet 470 having low thermal resistance and high electrical resistance properties can be disposed over the entire support plate 442, or at least the contact points between the plurality of embosses 446 and the thermostats 450 and the conductive underside of the glass heating element 422. In other embodiments, individual portions of thermally conductive tape (not shown) can be provided locally at each location of the embosses 446 and/or thermostats 450. The thermally conductive sheet 470 or thermally conductive tape can include, for example, UL (Underwriter Laboratories) listed silicone electrically insulating material. The glass heating element 422 can be disposed directly on the thermally conductive sheet 470 and supported by the plurality of embosses 446 under the sheet 470. Exemplary embodiments of a thermally conductive sheet and thermally conductive tape which is described in greater detail with reference to FIGS. 13A-15C.

An upper edge or perimeter surface of the glass heating element 422 can be covered by one or more gasket strips 480 for spills or liquids. The frame 416 can be disposed over the gasket strips 480 and the glass heating element 422, and then secured to the support plate 442. The rear panel 418 may be disposed over a rear strip of the gasket strips 480. In this way, the glass heating element 422 can form both a floor surface of the warming drawer module 404 and the heating surface of the warming drawer module 404, thereby keeping spills or other liquids away from electrical components in the module 404, and such that the items to be warmed can be placed directly on the glass heating element 422 when the warming drawer 404 is deployed.

As shown in FIG. 7, the support plate 442 can include a wire guide 491 coupled to an underside of the support plate 442 for guiding one or more wires or cables from for example the thermostats 450, the heating element 422, or other electrical components to the interior of the front panel 406 and the control panel 412. The support plate 442 and the thermally conductive sheet 470 can include corresponding openings to permit the electrical leads from the glass heating element 422 to pass through the support plate 442 and the thermally conductive sheet 470 to the wire guide 491. The frame 416 optionally can include a drip guard 490 to protect an electrical connection from spills. For example, the drip guard 490 can guide spills, cleaning solutions, etc. from the upper surface of the glass heating element 422 and the frame 416 away from and around a first electrical connector (such as a first wiring harness connector) on the support plate 442, which may be disposed at an end of the wire guide 491, and a second electrical connector (such as a second wiring harness connector) in the front panel 406 that leads to the control panel 412, and/or away from the electrical components above or below the support plate 442 or on the glass heating element 422.

As explained above, the warming drawer module 404 and the functional components are movable in and out of the warming drawer housing 402. In the embodiment of FIG. 7, a pair of slides 424 can be coupled to the support plate 442, and particularly, for example, to the underside of the support plate 442. The channel 426 can be coupled to the slides 424 to complete the warming drawer module 404. One of ordinary skill will recognize that the warming drawer module 404 is not limited to particular features and arrangement shown in FIG. 7 and additional or alternative parts, components, and arrangements may be included in the warming drawer module 404 within the spirit and scope of the invention.

Figure 8:
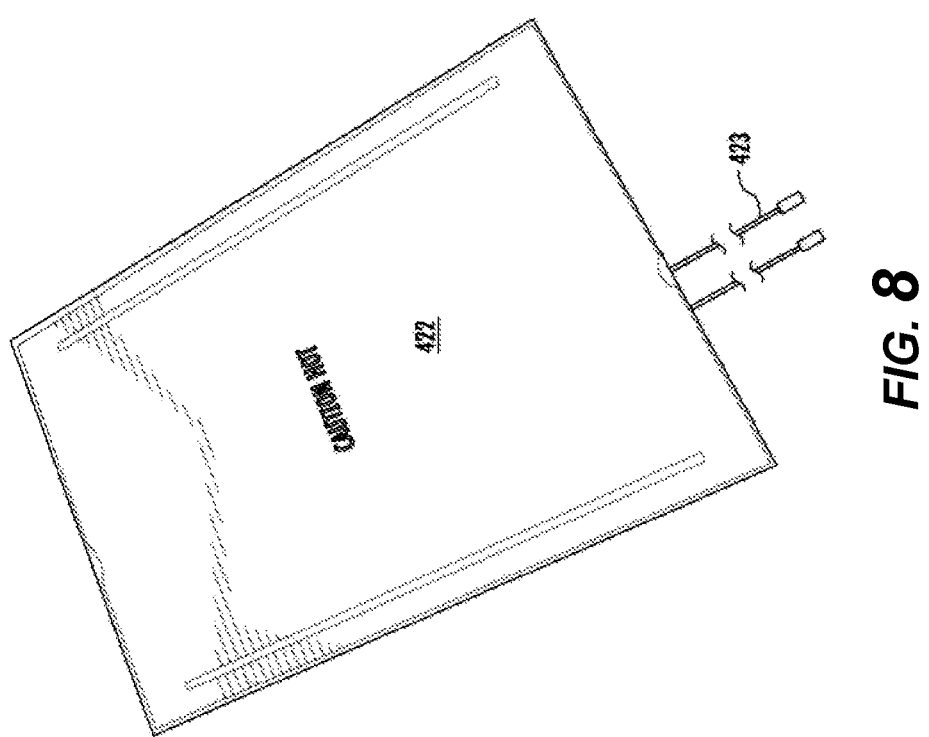
FIG. 8 is a perspective view of a heater device according to an exemplary embodiment of the invention.

With reference to FIG. 8, an exemplary heating device for a warming drawer module will now be described.

An exemplary heating device can include, for example, a ceramic/glass heating element 422 forming a floor surface of the warming drawer module for supporting the items to be warmed, such as food, plates, cookware, cutlery, etc. The heating element 422 can be a resistance heating element, for example, that operates similar to a rear window defroster of an automobile. The glass heating element 422 can include a glass ceramic surface having a plurality of heating element conducting paths or a uniform conductive coating (e.g., a clear, uniform conductive coating), for example, a 780 W element, thereby providing quick and even heating of items in the warming drawer module. More particularly, the underside of the ceramic/glass heating element 422 can include a thin metal layer or conductive coating that can generate heat evenly across the entire surface when provided with an electric current supplied, for example, by one or more power supply lines/wires/connectors 423. In the example, the entire surface can form a portion of an electric circuit such that the entire surface of glass/ceramic heating element 422 can generate heat (e.g., evenly generate heat). The ceramic/glass heating element 422 can provide uniform heat across an entire floor surface of the warming drawer module 404. The glass heating element can be easily cleaned, thereby reducing cleaning time and effort by the user for cleaning up spills, etc. from the floor surface of the warming drawer. The glass heating element 422 may include other features, such as a hot surface indicator (e.g., active indicator) for notifying a user or technician when the heating surface is hot, a passive warning for example painted on the glass surface, or an automatic shut-off timer to avoid overheating of the glass heating element 422 or reduce energy consumption in the event a user inadvertently fails to turn off the warming drawer, among other things.

With reference to FIGS. 9A-11D, exemplary embodiments of a support plate 442, which can support a glass/ceramic heating element 422 of the warming drawer module 404, will now be described.

As shown in FIG. 9A, an exemplary embodiment of a support plate 442 can include one or more support means (e.g., 446) for simply, easily, and inexpensively supporting an underside of the glass/ceramic heating element 422 such that the element 422 will not be damaged by items loaded on the glass/ceramic heating element 422 of the warming drawer module 404. The support means (e.g., 446) can minimize an amount of thermal and/or electrical contact area between the support means (e.g., 446) and the underside of the glass/ceramic heating element 422. For example, the support means (e.g., 446) can simultaneously minimize an amount of contact between that support means (e.g., 446) and the underside of the glass/ceramic heating element 422, which also may minimize heat transfer away from the glass/ceramic heating element 422 in a downward direction (i.e., in a direction away from the items to be warmed, which is an undesired direction for heat transfer), and which may minimize an amount of contact area of the support plate 442 that will need to be electrically insulated from the conductive underside of the glass/ceramic heating element 422. The support means (e.g., 446) also can control a height of the glass/ceramic heating element 422 above a surface of a support plate 442 (i.e., suspend the heating element 422 above the support plate 442) to provide a predetermined height or clearance for a thermostat 450 and thermostat retainer 460 to be disposed under the glass/ceramic heating element 422 and in contact with the underside of the glass/ceramic heating element 422. By controlling the height of the glass/ceramic heating element 422 above the surface of the support plate 442, the support means (e.g., 446) also can provide sufficient space for wire routing between the glass/ceramic heating element 422 and the metal support plate 442, for example, to route the wires 423 of the heating panel 422.

As shown in FIG. 9A, the exemplary support plate 442 can include one or more supporting means or features, such as a plurality of embosses 446 for supporting (e.g., evenly and distributively supporting) the underside of the glass/ceramic heating element 422 at a predetermined distance above the support plate 442, while also minimizing thermal and electrical contact areas between the heating element 422 and the support plate 442. The plurality of embosses 446 can be disposed in various arrangements, patterns, and distributions on the support plate 442 to support the heating element 422 depending on the size and shape of the heating element 422. The embosses can be evenly spaced with respect to each other such that the embosses 446 provide equal support for each of the edges of the glass heating element 422 near the corners of the heating element 422, and particularly, for example, in areas in which the frame 416 will clamp down on the glass heating element 422 during assembly, thereby reducing or preventing damage to the glass/ceramic heating element 422, for example, during assembly of the warming drawer module 404. The support plate 442 can include a metal support plate, such as a stainless steel support plate or other suitable heat resistant material, that is capable of being embossed using an emboss tool. In other embodiments, the support plate 442 can be formed from other materials such as, for example, other heat resistant materials that are capable of being formed by embossing, casting, or molding processes.

The support plate 442 can include one or more openings 447 for receiving one or more thermostat retainers 460 that support and fix one or more thermostats 450 in the space provided by the embosses 446 and in a predetermined position and height above the surface of the support plate 442 such that the thermostat 450 is against the underside of the glass heating element 422. The support plate 442 can include one or more tabs 448 and/or one or more openings or slots 449 for engaging a rear portion and/or front portion of the drawer slides (424; not shown in FIG. 9A). The support plate 442 can include one or more openings 444, for example, for guiding the wires 423 (e.g., power supply lines, control lines, and/or electrical connectors) of the glass/ceramic heating element 422 from the space provided by the embosses 446, for example, to the control panel 412. The embosses 446 can control a height of the glass/ceramic heating element 422 above a surface of the support plate 442 to provide a predetermined height or clearance for routing the wires 423 between the glass/ceramic heating element 422 and the metal support plate 442. A grommet (not shown) can be provided in the opening 444 to protect the wires 423 from damage or wear from contacting an edge of the opening 444.

FIG. 9B shows an enlargement of an exemplary emboss 446 in FIG. 9A. The emboss 446 can include, for example, an upper surface 446a (e.g., having a substantially horizontal planar surface or a rounded surface) for supporting the underside of the glass/ceramic heating element 422, a plurality of side surfaces 446b (e.g., tapered or rounded side surfaces), and a plurality of tapered or rounded corners 446c. With reference to FIGS. 10A-10C, the embosses 446 of the support plate can have a variety of shapes and/or profiles that are capable of supporting the underside of the glass heating element 422. When viewed from a side (e.g., in a direction parallel to a plane of the surface of the support plate and heating element), the emboss 446 can include, for example, a substantially planar, horizontal upper surface to distribute the forces between the emboss 446 and the underside of the heating element 422, as shown in FIGS. 10A-10C. In other embodiments, the side profile of the emboss 446 can have other shapes, such as a round shape. The emboss 446 can include angled, tapered, or rounded/curved corners and/or sides to protect the underside of the glass/ceramic heating element 422 from damage. In other embodiments, an emboss 446 can be separately formed in a single shape, or include a plurality of adjacent shapes, such as an emboss formed from a series of shapes, as shown, for example, in FIG. 10C. When viewed from above (i.e., in a direction normal to the surface of the support plate 442 and heating element 422), the embosses 446 can be, for example, rectangular-shaped embosses, square-shaped embosses, circular-shaped embosses, oval-shaped embossed, triangular-shaped embosses, among other shapes.

Figure 11B:
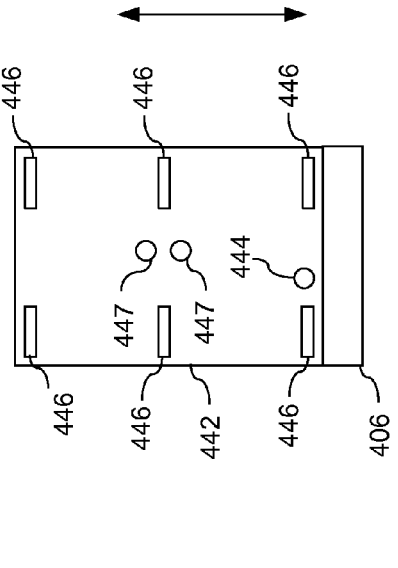
FIGS. 11A-11D are schematic plan views of support plates having embosses according to exemplary embodiments of the invention.
Figure 11D:
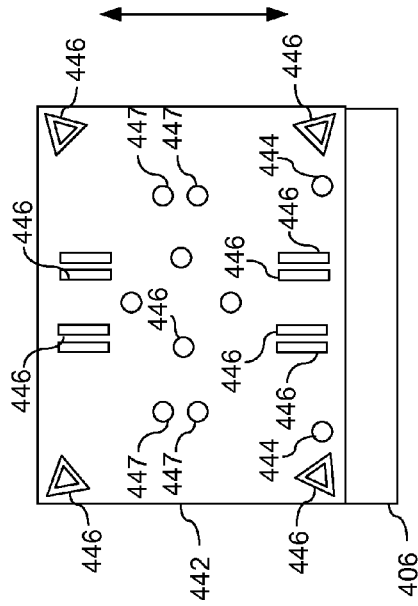
Figure 11A:
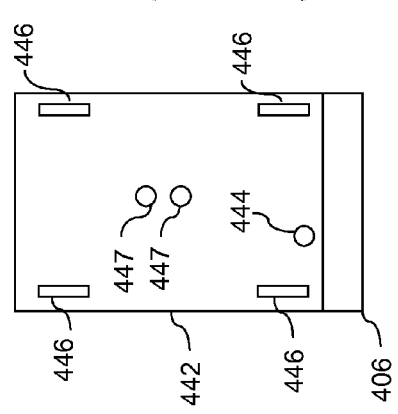

FIGS. 11A and 11D illustrate exemplary embodiments of a support plate 442 having a plurality of embosses 446 for supporting the glass heating panel. FIG. 11A illustrates an arrangement similar to FIG. 9, in which the support plate 442 include four embosses 446 positioned, respectively, at each corner of the support plate 442. In this example, the embosses 446 are rectangular shaped embosses with a longer side of the emboss extending in a direction of deployment of the warming drawer, shown by the arrows.

Figure 11C:
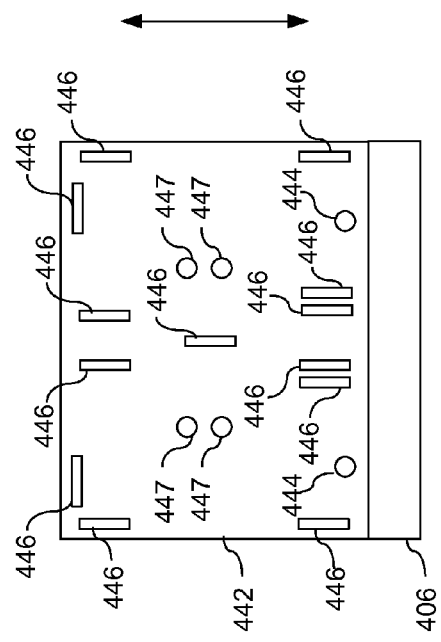

The support plate 442 can have various sizes depending on the size and configuration of the warming drawer 400. For example, the support plate 442 a width of the support plate 442 can be larger than a length of the support plate 442 in the deployment direction. The support plate 442 can include a variety of layouts of embosses to provide support for one or more heating elements. In the examples, the support plate 442 can be used with a single glass/ceramic heating elements 422 having a plurality of wires 423 (e.g., for a plurality of circuits formed on a single glass sheet) or with a plurality of glass/ceramic heating elements 422, for example, disposed in a side-by-side arrangement on the support plate 442. For example, as shown in FIG. 11C, the support plate 442 may have a plurality of openings 444 for receiving wires from one or more heating panels and openings 447 for receiving a plurality of thermostat retainers and thermostats. The embosses can extend in the same direction or in different directions. As shown in FIGS. 11A-11D, the embosses 446 can have the same shape or different shapes on the same support plate 442. The embosses may be symmetrically arranged with respect to each other or to the support plate 442. In other embodiments, for example as shown in FIG. 12A, the embosses may be symmetrically arranged with respect to the openings 444 or 447. In still other embodiments, for example, as shown in FIG. 12B, the embosses may be non-symmetrically arranged with respect to the openings 444 or 447.

With reference to FIG. 13A, an exemplary embodiment of a thermostat of the warming drawer will now be described.

As shown in FIG. 13A (and explained with reference to FIG. 9A), the support plate 442 can include one or more supporting means or features, such as a plurality of embosses 446 for supporting (e.g., evenly and distributively supporting) the underside of the glass/ceramic heating element (e.g., 422 in FIGS. 7 and 8) at a predetermined distance above the support plate 442, while also minimizing thermal and electrical contact areas between the heating element 422 and the support plate 442. As shown in FIG. 13A, the support plate 442 can include one or more thermostats 450 positioned on the support plate 442, for example, using thermostat retainers 460, disposed in openings (e.g., 447 in FIGS. 9A-12B) in the support plate 442.

The thermostat 450 is disposed in the space between a surface of the support plate 442 and an underside of the glass/ceramic heating element (not shown in FIG. 13A; see 422 in FIG. 8), and in thermal contact with the bottom surface of the glass/ceramic heating element 422 in order to monitor the temperature of the glass heating element 422 and minimize or prevent a risk of the heating element 422 exceeding a predetermined temperature that may result in damage or overheating of the heating element 422. For example, in an embodiment, the thermostat 450 can be wired in series with the heating element 422 and a power supply (not shown) and configured to interrupt or disconnect the power supply path to the heating element 422 when a predetermined temperature is reached at the thermostat 450. If a temperature of the heating element 422 exceeds a predetermined maximum temperature or temperature threshold during operation, then the thermostat 450 may open the power circuit to the heating element 422, thereby interrupting the power supply to the heating element 422 and preventing overheating of the heating element 422. In this example, a control unit (e.g., 412 in FIG. 6) may not receive any feedback from the thermostats 450 at all, and may continue to supply power to the heating element 422, with the thermostat 450 being responsible for interrupting power to the heating element 422 when the predetermined temperature is reached. Instead, the control unit of the warming drawer additionally or alternatively can be configured to control the operation of the heating element 422 based on an air temperature obtained by a separate air temperature sensor (e.g., an RTD air temp sensor; not shown) disposed in the warming drawer, such as at the back of the warming drawer. In this way, the thermostat 450 can monitor the temperature of the heating element 422 and minimize or prevent a risk of the heating element 422 exceeding a predetermined temperature that may result in damage or overheating of the heating element 422 without a control unit without a control unit. In another embodiment, a control unit (e.g., 412 in FIG. 6) of the warming drawer can be additionally or alternatively configured to receive temperature information from the thermostat 450 such that the control unit can control the operation of the heating element 422 based on the temperature obtained by the thermostat 450 and/or that the control unit can shut down the heating element 422, if needed, prior to an occurrence of damage to, or overheating of, the heating element 422 or the warming drawer, or adjacent components of the appliance.

The support plate 442 can include one or more openings 444 for passing one or more wires, for example, from the heating element to a wire guide or channel on an underside of the support plate 442 and an electrical connection 489. The electrical connection 489 can be connected, for example, to a corresponding electrical connection leading to a control unit (e.g., 412 in FIG. 7) in a front panel (e.g., 406 in FIG. 7) for controlling the heating element. FIG. 13A also shows some of the features for assembling the warming drawer shown in FIG. 7, such as a locking feature 432 at a rear portion of a U-shaped channel (e.g., 426 in FIG. 7) that engages or locks into a corresponding locking features (not shown) in the rear wall of the warming drawer housing (shown in FIG. 7), a front portion 435 of the U-shaped channel having openings 437 that can be secured (for example, with one or more screws) to a portion of the warming drawer housing at a location that is accessible to a user or technician from the front of the appliance in order to facilitate easy removal and replacement of the warming drawer module (e.g., 404 in FIG. 7) for repairs, replacement, modifications, and/or cleaning of the warming drawer module, and one or more tabs 448 for engaging a rear portion of a pair of drawer slides (e.g., 424 in FIG. 7).

With reference to FIGS. 13B-15C, exemplary embodiments of a thermally conductive layer will now be described.

As shown in FIG. 13B, an exemplary embodiment can include a thermally conductive layer, such as a thermally conductive sheet 470, between the sensor of each thermostat 450 and the underside of the heating element (not shown in FIG. 13A; see 422 in FIG. 8), thereby improving thermal contact between the sensor of each thermostat 450 and the underside of the heating element 422, and ensuring an accurate determination of a true temperature of the heating element 422. The thermally conductive layer can be formed from a material having low thermal resistance (i.e., thermally conductive). The material forming the thermally conductive layer also advantageously can have high electrical resistance properties, thereby providing an additional advantage of electrically insulating each of the embosses from the electrically conductive underside of the heating element 422. The thermally conductive sheet 470 or thermally conductive tape can include, for example, UL (Underwriter Laboratories) listed silicone electrically insulating material.

With reference again to FIG. 13B, the thermally conductive sheet 470 can be disposed over the entire support plate 442 or at least the contact points between the thermostats 450 and the conductive underside of the glass heating element 422. In an assembled state, the thermally conductive sheet 470 can be held in compression between the conductive underside of the glass heating element 422 and the thermostats 450. The sheet 470 can include one or more openings 474 corresponding to one or more openings on the support plate 442, such as one or more openings 444 for passing the wires from the heating element to a wire guide or channel on an underside of the support plate 442.

With reference again to FIG. 13B, the thermally conductive sheet 470 also can be disposed over the contact points between the embosses 446 and the conductive underside of the glass heating element 422. In an assembled state, the thermally conductive sheet 470 can be held in compression between the conductive underside of the glass heating element 422 and the embosses 446.

The thermally conductive sheet 470 can be placed over the support plate 442 without securing means for holding the sheet 470 in place. The sheet 470 can be held in place by the compression forces exerted on the sheet 470 by the thermostat 450 and/or the embosses 446 pressing against the underside of the heating element 422 and compressing the sheet 470 therebetween. In other embodiments, the thermally conductive sheet 470 can include, for example, an adhesive layer on one or both sides. For example, the adhesive layer can include a 'peel-and-stick' adhesive layer or other type of adhesive layer, for example, such as adhesives used for heat sinks. The sheet 470 can include adhesive over an entire surface of the sheet 470, or in particular location, such as along one or more edges or a location corresponding to the location of the thermostats 450 and/or embosses 446.

As shown in FIGS. 14A and 14B, in other embodiments, the thermally conductive layer can include individual portions of thermally conductive film or tape 472 at each location of the thermostats 450, instead of a sheet 470. The individual portions of thermally conductive tape 472 can be disposed over each of the contact points between the conductive underside of the glass heating element 422 and the thermostats 450. In an assembled state, the thermally conductive film or tape 472 can be held in compression between the conductive underside of the glass heating element 422 and the thermostats 450. The thermally conductive tape 472 can include, for example, a UL (Underwriter Laboratories) listed silicone electrically insulating material such as a known conductive tape produced by 3M®, which commonly may be used for heat sink applications.

The thermally conductive tape 472 can include, for example, an adhesive layer on one or both sides. For example, the adhesive layer can include a 'peel-and-stick' adhesive layer or other type of adhesive layer, for example, such as an adhesive used for heat sinks. In an embodiment, the thermally conductive tape 472 can include an adhesive layer on a first side, such that the adhesive on the first side of the tape can be adhered to a top of a thermostat 450, thereby assuring sufficient contact between the thermally conductive tape 472 and the thermostat 450 and maintaining the correct position of the thermally conductive tape 472 during assembly. In another an embodiment, the thermally conductive tape 472 can include an adhesive layer on both sides, such that the adhesive on the first side of the tape can be adhered to a top of a thermostat 450 and the adhesive on the second side of the tape can be adhered to the underside of the heating element 422, thereby assuring sufficient contact between the thermally conductive tape 472 and the thermostat 450 and the underside of the heating element 422, and maintaining the correct position of the thermally conductive tape 472 during assembly. In other embodiments, the thermally conductive tape 472 may not include an adhesive layer and may be held in place solely by the compression forces exerted on the tape 472 by the thermostat 450 pressing against the underside of the heating element 422 and compressing the tape 472 therebetween when the warming drawer is in an assembled state.

The thermally conductive tape 472 can have a size a shape that covers, or at least corresponds to, a size and shape of one or more thermostats 450. For example, the thermally conductive tape 472 can have a rectangular shape that covers one or more thermostats 450 (e.g., two adjacent thermostats), as shown in the example in FIG. 14A. In other embodiments, the thermally conductive tape 472 can have a circular, oval, triangular, or square shape etc. that corresponds to a shape of, and covers, one or more thermostats 450, as shown in the example in FIG. 14B, which includes circular shaped thermally conductive tape 472.

While the thermally conductive film or tape 472 is intended to improve the thermal conductivity between the thermostat 450 and the heating element 422, the thermally conductive tape 472 also can have electrically insulative properties. Accordingly, in other embodiments, individual portions of the tape 472 also can be disposed over each of the contact points between the conductive underside of the heating element 422 and the embosses 446. In an assembled state, the tape 472 can be held in compression between the conductive underside of the heating element 422 and the embosses 446. In this instance, the tape 472 similarly can include an adhesive layer on one or both sides, such as a 'peel-and-stick' adhesive layer or other type of adhesive layer (e.g., an adhesive used for heat sinks). In other embodiments, the tape 472 may be held in place solely by the compression forces exerted on the tape 472 by the embosses 446 pressing against the underside of the heating element 422 and compressing the tape 472 there between when the warming drawer is in an assembled state. These portions of tape 472 can have a size a shape that covers, or at least corresponds to, a size and shape of one or more embosses 446. For example, the tape 472 can have a rectangular, circular, oval, triangular, or square shape etc. that corresponds to a shape of, and covers, one or more embosses 446. The thermally conductive tape 472 can include other sizes and shapes, for example, that correspond to the size and shape of one or more of the embosses in the examples illustrated in FIGS. 9A-12B. The thermally conductive tape 472 can cover portions or areas of the support plate 442, for example, to cover clusters or groupings of embosses 446 and/or thermostats 450, instead of the entire support plate 442 or only the embosses 446 or thermostats 450.

Figure 15A:
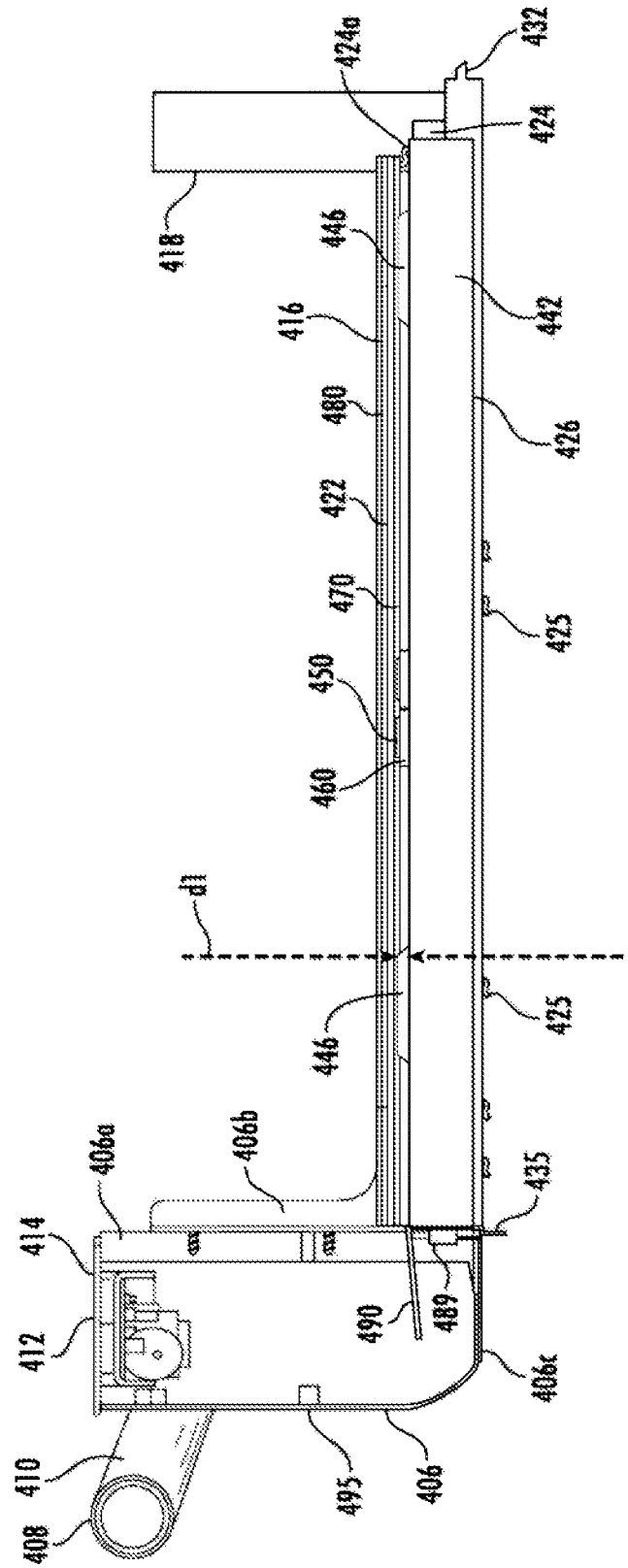
FIG. 15A is a schematic, cut-away side view of a warming drawer assembly according to an exemplary embodiment of the invention.
Figure 15B:
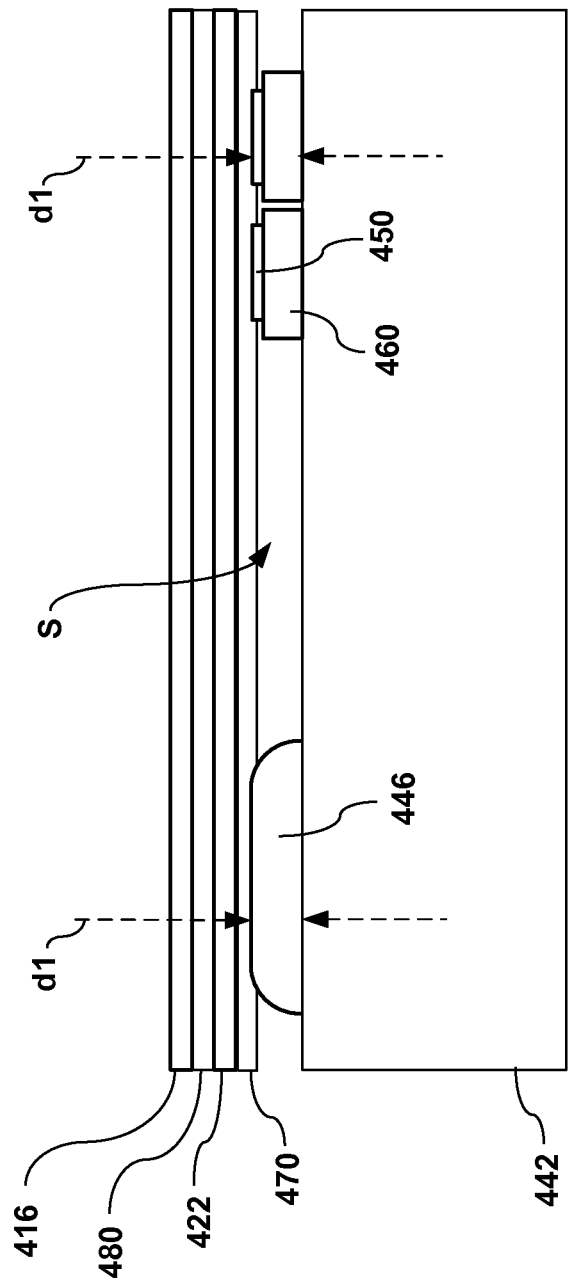
FIG. 15B is a schematic, cut-away partial side view of a warming drawer assembly according to the exemplary embodiment of FIG. 15A.

FIG. 15A illustrates a side, cut-away view of an assembled warming drawer module 404 according to the exemplary embodiment illustrated in FIG. 7, and having the thermally conductive sheet 470 illustrated, for example, in FIG. 13B. FIG. 15B is an enlargement of a partial side view of FIG. 15A.

As shown in FIG. 15A, the assembled warming drawer module 404 can include a front panel 406 having a handle 408 coupled to the front panel 406 via handle mounts 410. The front panel 406 optionally can include a control panel 412 disposed in an opening or recess in an upper surface 414 of the front panel 406, and as another option, one or more indicator lights 495 (e.g., an LED indicator light) on a front surface of the front panel 406 to indicate when the warming drawer 400 is in operation, when the heating element is hot, etc. The front panel 406 can include a rear portion 406a that encloses a rear side of the front panel 406 and a bracket 406b for coupling the rear portion 406a to a front portion of a frame 416 of the warming drawer module 404. A rear portion of the frame 416 can be coupled to a rear panel 418 via brackets (not shown in FIG. 15A).

A drawer slide 424 can be coupled to a support plate 442 (e.g., stainless steel support plate), and particularly, for example, to the underside of the support plate 442. In the illustrated example, the slide 424 can include one or more projections 424a that engage corresponding openings (not shown in FIG. 15A) in the support plate 442. The channel 426 can be coupled to an underside of the slide 424. For example, the slide 424 can include one or more projections 425 on an underside of the slide 424 that engage corresponding openings in the U-shaped channel 426. FIG. 15A shows the locking feature 432 at a rear portion of the U-shaped channel 426 that engages or locks into a corresponding locking features (not shown) in the rear wall of the warming drawer housing, and a front portion 435 of the U-shaped channel 426 that can be secured (for example, with one or more screws) to a portion of the warming drawer housing at a location that is accessible to a user or technician from the front of the appliance in order to facilitate easy removal and replacement of the warming drawer module 404 for repairs, replacement, modifications, and/or cleaning of the warming drawer module 404.

As shown in FIGS. 15A and 15B, the exemplary warming drawer 400 can include a glass heating element 422 supported by a plurality of embosses 446 formed on the support plate 442. The glass heating element 422 can be supported by the embosses 446 at a predetermined distance d1 above the support plate 442, thereby minimizing thermal and electrical contact areas between the heating element 422 and the support plate 442. The warming drawer 400 can include one or more thermostat retainers 460 that support and fix one or more thermostats 450 such that a portion of each retainer 460 and the sensor of each thermostat 450 is disposed within the predetermined distance d1 between the upper surface of the support plate 442 and the underside of the glass heating element 422, which is provided by the embosses 446. The predetermined distance d1 can be selected to correspond to the particular height of the assembly of the thermostat retainer 460 and thermostats 450 to ensure that the sensor of the thermostat 450 obtains sufficient conductive contact with the underside of the heating element 422 to provide accurate temperature measurements of the true temperature of the heating element 422.

Each thermostat retainer 460 can support the sensor of the thermostat 450 in a predetermined position above the upper surface of the support plate 442 (for example, at a height that meets government and agency minimum electrical clearance requirements) such that the thermostat 450 is pressed upward against the underside of the glass heating element 422 when the warming drawer module 404 is in an assembled state. As shown in FIG. 15B, the thermally conductive sheet 470 can be disposed in a state of compression between the thermostat 450 and the underside of the glass heating element 422, which may further improve thermal contact between the sensor of the thermostat 450 and the underside of the glass heating element 422.

With reference again to FIGS. 15A and 15B, the glass heating element 422 is disposed over the thermally conductive sheet 470, the plurality of embosses 446 of the support plate 442, and the thermostats 450. The wires (not shown) of the heating element 422 can be guided in the space S between the upper surface of the support plate 442 and the underside of the glass heating element 422. An upper edge or perimeter surface of the glass heating element 422 can be covered by one or more gasket strips 480, which may form a gasket or seal between the glass heating element 422 and the frame 416. The frame 416 can be disposed over the gasket strips 480 and the glass heating element 422, and then secured to the support plate 442, thereby keeping spills or other liquids away from electrical components in the module 404.

Figure 15C:
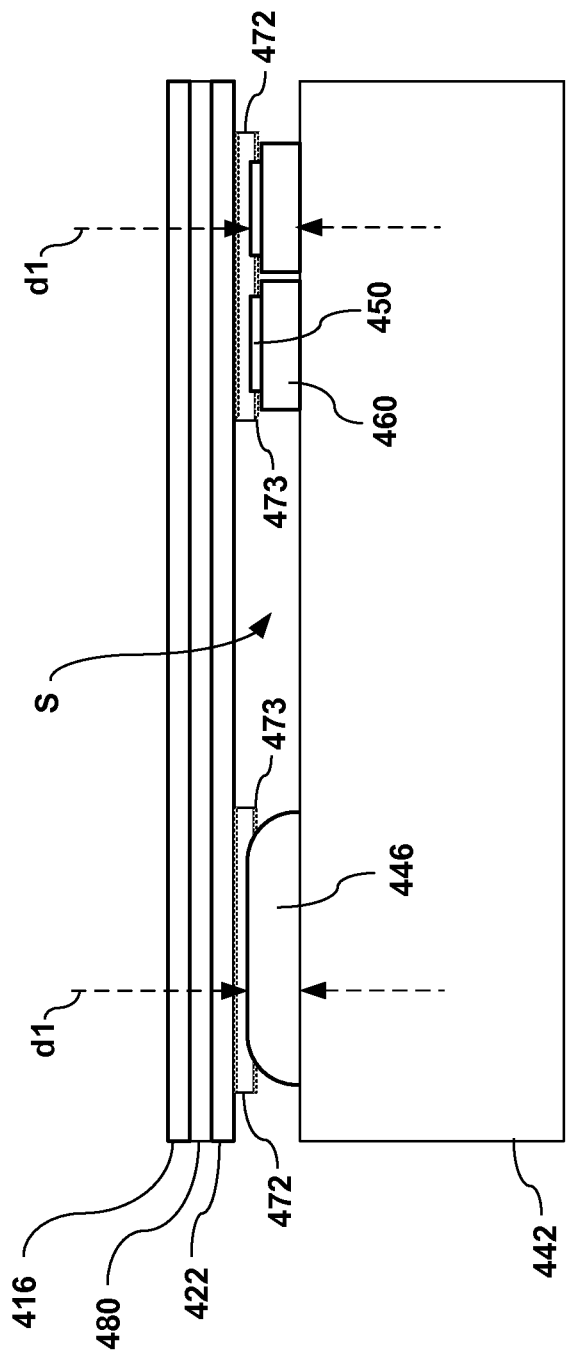
FIG. 15C is a schematic, cut-away partial side view of a warming drawer assembly according to another exemplary embodiment of the invention.

FIG. 15C illustrates another exemplary embodiment having individual portions of thermally conductive film or tape 472 disposed at each location between the underside of the glass heating element 422 and thermostats 450 and embosses 446, instead of a sheet 470. The individual portions of thermally conductive film or tape 472 can be disposed in a state of compression between each thermostat 450 (or group of thermostats 450) and the underside of the glass heating element 422, which may further improve thermal contact between the sensor of the thermostat 450 and the underside of the glass heating element 422. The thermally conductive tape 472 can include an optional adhesive layer (473 shown by dashed lines) on the surface adjacent to the thermostat 450 or the embosses 446 and/or the underside of the heating element 422.

The glass heating element 422 is disposed over the thermally conductive tape 472, the plurality of embosses 446 of the support plate 442, and the thermostats 450. The wires (not shown) of the heating element 422 can be guided in the space S between the upper surface of the support plate 442 and the underside of the glass heating element 422. An upper edge or perimeter surface of the glass heating element 422 can be covered by one or more gasket strips 480 for spills or liquids, which may form a gasket or seal between the glass heating element 422 and the frame 416. The frame 416 can be disposed over the gasket strips 480 and the glass heating element 422, and then secured to the support plate 442, thereby keeping spills or other liquids away from electrical components in the module 404.

In this way, the exemplary embodiments can provide simple, easy to manufacture, and inexpensive means (e.g., 470 or 472) for improving the thermal conductivity between the thermostat (e.g., 450) and an underside of the glass/ceramic heating element (e.g., 422), thereby ensuring that a temperature limiting and regulating thermostat is capable of detecting an accurate and true temperature of the heating element, which may ensure that the thermostat is capable of detecting the true temperature of the heating element such that either the thermostat or a control unit can shut off power to the heating element in time to prevent damage or overheating.

The exemplary embodiments of the present invention may simplify the manufacturing process and reduce labor and time for manufacturing, thereby reducing manufacturing costs, for example, by providing a single sheet that covers the entire plate, providing adhesive on one or both side of the heat conductive sheet, film, or tape, while also providing for a cleaner installation, for example, by minimizing over application or excess application of other adhesives or eliminating the need for other insulation means between the support plate and the heating element.

In other embodiments, a household appliance can include a warming drawer with a fixed heating element. The warming drawer can include a support plate (e.g., 442) having support means (e.g., a plurality of embosses 446) supporting an underside of the heating element at a predetermined distance above the support plate.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A household appliance comprising:
   a warming drawer housing having an interior chamber; and
   a warming drawer module in the interior chamber, the warming drawer module being movable with respect to the warming drawer housing, the warming drawer module comprising a functional assembly configured to be, as a whole, releasably coupled to and decoupled from the warming drawer housing, the functional assembly including:
   a heating element forming a floor surface of the warming drawer module, the floor surface for receiving items to be warmed, the heating element being coupled to and movable with the warming drawer module;
   a thermostat having a sensor measuring a temperature of the heating element, the thermostat disposed under the heating element;
   a substantially planar thermally conductive layer disposed between an underside of the heating element and the sensor of the thermostat,
   wherein the warming drawer module is movable between a first position in which the heating element of the warming drawer module is in the interior chamber of the warming drawer housing and a second position in which a part of the heating element of the warming drawer module is outside the warming drawer housing;
   a power source on the warming drawer housing, the power source coupled to the heating element by an electrical connection when the warming drawer module is in the first position and the second position; and
   a control panel on the warming drawer module, the control panel controlling the heating element when the warming drawer module is in the first position and the second position,
   wherein the warming drawer module is releasably coupled to the warming drawer housing by a fixation element at a front of the warming drawer module and accessible from the front of the warming drawer module when the warming drawer module is in the first position such that the functional assembly of the warming drawer module is capable of being, as a whole, releasably coupled to and decoupled from the warming drawer housing.

2. The household appliance of claim 1, wherein the substantially planar thermally conductive layer includes a thermally conductive and electrically resistant layer.

3. The household appliance of claim 1, wherein the substantially planar thermally conductive layer includes one of a substantially planar thermally conductive sheet and a substantially planar thermally conductive tape.

4. The household appliance of claim 3, wherein the substantially planar thermally conductive layer includes an adhesive layer on a first side of the thermally conductive layer that contacts the thermostat.

5. The household appliance of claim 3, wherein the substantially planar thermally conductive layer includes a first adhesive layer on a first side of the substantially planar thermally conductive layer that contacts the thermostat and a second adhesive layer on a second side of the substantially planar thermally conductive layer that contacts the underside of the heating element.

6. The household appliance of claim 1, wherein, when the warming drawer is in an assembled state, the substantially planar thermally conductive layer is in a compressed state between the thermostat and the underside of the heating element.

7. The household appliance of claim 1, wherein the substantially planar thermally conductive layer includes a shape, when viewed in a direction perpendicular to a plane of the substantially planar thermally conductive layer, that corresponds to a shape of the thermostat.

8. The household appliance of claim 1, further comprising:
   a support plate that supports the heating element in a position above the support plate,
   wherein the substantially planar thermally conductive layer includes a thermally conductive sheet disposed between the support plate and the underside of the heating element, the substantially planar thermally conductive sheet covering the thermostat and an entire surface of the support plate.

9. The household appliance of claim 1,
wherein the power source supplies power to the control panel that controls the heating element when the warming drawer module is in the first position and the second position such that the control panel is capable of adjustably controlling the heating element based on a selected temperature setting of a plurality of temperature settings when the warming drawer module is in the first position and the second position.

10. The household appliance of claim 1, wherein the warming drawer module further includes:
a frame surrounding the heating element; and
a front panel coupled to the frame and covering an opening of the interior chamber of the warming drawer housing when the warming drawer module is in the first position.

11. The household appliance of claim 1, wherein the heating element includes a resistance heating element.

12. The household appliance of claim 1, wherein the heating element includes:
a glass ceramic surface;
a conductive coating forming a circuit on an underside of the ceramic surface, and
an electrical connection for supplying power to the conductive coating.

13. A household appliance comprising:
a warming drawer housing having an interior chamber; and
a warming drawer module in the interior chamber, the warming drawer module including:
a heating element forming a floor surface of the warming drawer module, the floor surface for receiving items to be warmed;
a thermostat having a sensor measuring a temperature of the heating element, the thermostat disposed under the heating element;
a thermally conductive layer disposed between an underside of the heating element and the sensor of the thermostat; and
a support plate that supports the heating element at a plurality of contact points and in a position above the support plate,
wherein the thermally conductive layer includes a thermally conductive sheet disposed between the support plate and the underside of the heating element, the thermally conductive sheet covering the thermostat and the plurality of contact points.

14. A household appliance comprising:
a warming drawer housing having an interior chamber; and
a warming drawer module in the interior chamber, the warming drawer module including:
a heating element forming a floor surface of the warming drawer module, the floor surface for receiving items to be warmed;
a thermostat having a sensor measuring a temperature of the heating element, the thermostat disposed under the heating element;
a thermally conductive layer disposed between an underside of the heating element and the sensor of the thermostat; and
a support plate that supports the heating element in a position above the support plate, the support plate including a plate portion and a plurality of embosses on the plate portion, the plurality of embosses supporting an underside of the heating element at a predetermined distance above the plate portion and forming a space between the plate portion and the underside of the heating element in which the thermostat is disposed.

15. The household appliance of claim 14, wherein the thermally conductive layer is disposed between an emboss of the plurality of embosses and the underside of the heating element.

16. The household appliance of claim 15, wherein the thermally conductive layer includes a shape that corresponds to a shape of the emboss.

17. The household appliance of claim 14, wherein the thermally conductive layer is disposed between each emboss of the plurality of embosses and the underside of the heating element.

18. The household appliance of claim 14, further comprising:
wherein the thermally conductive layer includes a thermally conductive sheet disposed between the support plate and the underside of the heating element, the thermally conductive sheet covering the thermostat and the plurality of embosses.

19. The household appliance of claim 14, further comprising:
wherein the thermally conductive layer includes a plurality of thermally conductive tape portions, each of the plurality of thermally conductive tape portions being disposed between a respective one of the plurality of embosses and the thermostat.

20. The household appliance of claim 14, wherein a height of an emboss of the plurality of embosses is equal to the predetermined distance.

21. The household appliance of claim 14, wherein the thermally conductive layer is disposed between the plurality of embosses and the underside of the heating element,
wherein, when the warming drawer is in an assembled state, the thermally conductive layer is in a compressed state between the plurality of embosses and the underside of the heating element, and
wherein, when the warming drawer is in an assembled state, a sum of a height of an emboss of the plurality of embosses and a compressed thickness of the thermally conductive layer is equal to the predetermined distance.

22. The household appliance of claim 21, wherein the thermally conductive layer includes a thermally conductive and electrically resistant layer.

23. The household appliance of claim 14, wherein the plate portion includes a first opening for guiding a wire from the heating element from the space between the plate portion and the underside of the heating element to an underside of the support plate, and
wherein the thermally conductive layer includes a second opening corresponding to the first opening for guiding the wire from the heating element from the space between the plate portion and the underside of the heating element to an underside of the support plate.

24. The household appliance of claim 14, wherein the plate portion includes an opening for positioning a thermostat in the space between the plate portion and the underside of the heating element.

25. The household appliance of claim 14, wherein the warming drawer module further includes:
a telescopic drawer slide coupled to the support plate, the telescopic drawer slide facilitating the movement of the warming drawer module between the first position and the second position.

26. A household appliance comprising:
a warming drawer housing having an interior chamber; and
a warming drawer module in the interior chamber, the warming drawer module being movable with respect to the warming drawer housing, the warming drawer module comprising a functional assembly configured to be, as a whole, releasably coupled to and decoupled from the warming drawer housing, the functional assembly including:
 a heating element forming a floor surface of the warming drawer module, the floor surface for receiving items to be warmed, the heating element being coupled to and movable with the warming drawer module;
 a thermostat having a sensor measuring a temperature of the heating element, the thermostat disposed under the heating element;
 substantially planar thermally conducting means for thermally coupling an underside of the heating element and the sensor of the thermostat,
 wherein the warming drawer module is movable between a first position in which the heating element of the warming drawer module is in the interior chamber of the warming drawer housing and a second position in which a part of the heating element of the warming drawer module is outside the warming drawer housing;
 a power source on the warming drawer housing, the power source coupled to the heating element by an electrical connection when the warming drawer module is in the first position and the second position; and
 a control panel for adjustably controlling the heating element based on a selected temperature setting of a plurality of temperature settings when the warming drawer module is in the first position and the second position
 wherein the warming drawer module is releasably coupled to the warming drawer housing by a fixation element at a front of the warming drawer module and accessible from the front of the warming drawer module when the warming drawer module is in the first position such that the functional assembly of the warming drawer module is capable of being, as a whole, releasably coupled to and decoupled from the warming drawer housing.

27. The household appliance of claim 26, further comprising:
 support means for supporting the heating element in a position above the support plate, the support means supporting an underside of the heating element at a predetermined distance above a plate portion of the support means and forming a space between the plate portion and the underside of the heating element in which the thermostat is disposed,
 wherein the substantially planar thermally conducting means electrically insulates the underside of the heating element from the support means.

28. The household appliance of claim 26, wherein the heating element includes:
 a glass ceramic surface;
 a conductive coating forming a circuit on an underside of the ceramic surface, and
 an electrical connection for supplying power to the conductive coating.

29. A household appliance comprising:
a warming drawer housing having an interior chamber; and
a warming drawer module in the interior chamber, the warming drawer module including:
 a heating element forming a floor surface of the warming drawer module, the floor surface for receiving items to be warmed;
 a thermostat having a sensor measuring a temperature of the heating element, the thermostat disposed under the heating element;
 thermally conducting means for thermally coupling an underside of the heating element and the sensor of the thermostat; and
 a support plate that supports the heating element in a position above the support plate, the support plate including a plate portion and a plurality of embosses on the plate portion, the plurality of embosses supporting an underside of the heating element at a predetermined distance above the plate portion and forming a space between the plate portion and the underside of the heating element in which the thermostat is disposed,
 wherein the thermally conducting means electrically insulates the underside of the heating element from the plurality of embosses.

30. A household appliance comprising:
a warming drawer housing having an interior chamber; and
a warming drawer module in the interior chamber, the warming drawer module being movable with respect to the warming drawer housing, the warming drawer module comprising a functional assembly configured to be, as a whole, releasably coupled to and decoupled from the warming drawer housing, the functional assembly including:
 a heating element forming a floor surface of the warming drawer module, the floor surface for receiving items to be warmed, the heating element being coupled to and movable with the warming drawer module;
 a thermostat having a sensor measuring a temperature of the heating element, the thermostat disposed under the heating element;
 a substantially planar thermally conductive layer disposed between an underside of the heating element and the sensor of the thermostat,
 wherein the warming drawer module is movable between a first position in which the heating element of the warming drawer module is in the interior chamber of the warming drawer housing and a second position in which a part of the heating element of the warming drawer module is outside the warming drawer housing;
 a power source on the warming drawer housing, the power source coupled to the heating element by an electrical connection when the warming drawer module is in the first position and the second position;
 a control panel on the warming drawer module, the control panel controlling the heating element when the warming drawer module is in the first position and the second position; and
 a support plate that supports the heating element at a predetermined distance above the support plate and forms a space between the support plate and the underside of the heating element, wherein the thermostat is disposed in the space between the support plate and the underside of the heating element;
 wherein the support plate includes an opening, and
 wherein the electrical connection extends from the heating element into the space between the support plate and the underside of the heating element, through the opening in the support plate, and to the power source when the warming drawer module is in the first position and the second position.

31. The household appliance of claim 30, wherein the support plate includes another opening for guiding another electrical connection from the thermostat to the control panel when the warming drawer module is in the first position and the second position.

\* \* \* \* \*